(12) United States Patent
Morita

(10) Patent No.: US 10,075,616 B2
(45) Date of Patent: Sep. 11, 2018

(54) IMAGE PROCESSING SYSTEM INCLUDING IMAGE FORMING APPARATUS AND WEARABLE COMPUTER FOR AUTHENTICATING USER TO ACCESS IMAGE FORMING APPARATUS, WEARABLE COMPUTER, METHOD FOR USER AUTHENTICATION, AND NON-TRANSITORY RECORDING MEDIUM STORING COMPUTER READABLE PROGRAM FOR THE SAME

(71) Applicant: KONICA MINOLTA, INC., Chiyoda-ku, Tokyo (JP)

(72) Inventor: Akemi Morita, Nara (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/452,782

(22) Filed: Mar. 8, 2017

(65) Prior Publication Data
US 2017/0280018 A1 Sep. 28, 2017

(30) Foreign Application Priority Data
Mar. 22, 2016 (JP) .................. 2016-056522

(51) Int. Cl.
*G06K 15/00* (2006.01)
*H04N 1/44* (2006.01)
*G06F 1/16* (2006.01)

(52) U.S. Cl.
CPC ............ *H04N 1/442* (2013.01); *G06F 1/163* (2013.01); *H04N 1/4426* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

2008/0216171 A1* 9/2008 Sano ................. H04L 9/32
726/19
2014/0168702 A1 6/2014 Morita
(Continued)

FOREIGN PATENT DOCUMENTS

JP  2004276271 A  10/2004
JP  2005006824 A   1/2005
(Continued)

OTHER PUBLICATIONS

Websites by Mash Media Inc., "Techable"; and "Nymi, biometric authentication band using heartbeat, is released to consumers this autumn" searched on Mar. 2, 2016 at http://techable.jp/archives/18291.

*Primary Examiner* — Henok A Shiferaw
(74) *Attorney, Agent, or Firm* — Holtz, Holtz & Volek PC

(57) ABSTRACT

A wearable computer includes: a first storage that permanently stores a first characteristic therein, the first characteristic representing a physical characteristic of an owner of the wearable computer; an obtaining portion that obtains a second characteristic, the second characteristic representing a physical characteristic of a user who wears the wearable computer; a determination portion that determines whether the user is the owner based on the first characteristic and the second characteristic; a first request portion that requests, when the user is determined to be the owner, to allow the user to log into another device; a second storage that temporarily stores the second characteristic therein; and a second request portion that requests, when the user is not determined to be the owner, to allow the user to log into that another device by sending the second characteristic stored in the second storage portion to that another device.

19 Claims, 33 Drawing Sheets

(56) References Cited

U.S. PATENT DOCUMENTS

| | | | | |
|---|---|---|---|---|
| 2015/0201099 A1* | 7/2015 | Hamasaki | ........... | H04N 1/00318 358/1.15 |
| 2015/0234624 A1* | 8/2015 | Nii | ......................... | G06F 3/1238 358/1.14 |
| 2016/0354033 A1 | 12/2016 | Ouchi et al. | | |
| 2016/0380993 A1* | 12/2016 | Shiraishi | ................. | H04L 63/06 726/7 |
| 2017/0061423 A1* | 3/2017 | Bryant | ............... | G06Q 20/3226 |
| 2017/0171430 A1* | 6/2017 | Tanaka | ................... | H04N 1/442 |
| 2017/0228624 A1* | 8/2017 | Nakayama | .......... | G06K 15/4055 |
| 2017/0269886 A1* | 9/2017 | Ozawa | ................. | G06F 3/1238 |

FOREIGN PATENT DOCUMENTS

| | | | |
|---|---|---|---|
| JP | 2008073461 | A | 4/2008 |
| JP | 2008073462 | A | 4/2008 |
| JP | 2008225486 | A | 9/2008 |
| JP | 2012159984 | A | 8/2012 |
| JP | 2013084179 | A | 5/2013 |
| JP | 2014121034 | A | 6/2014 |
| JP | 2015150375 | A | 8/2015 |

* cited by examiner

IMAGE PROCESSING SYSTEM INCLUDING IMAGE FORMING APPARATUS AND WEARABLE COMPUTER FOR AUTHENTICATING USER TO ACCESS IMAGE FORMING APPARATUS, WEARABLE COMPUTER, METHOD FOR USER AUTHENTICATION, AND NON-TRANSITORY RECORDING MEDIUM STORING COMPUTER READABLE PROGRAM FOR THE SAME

The present U.S. patent application claims a priority under the Paris Convention of Japanese patent application No. 2016-056522 filed on Mar. 22, 2016, the entirety of which is incorporated herein by reference.

BACKGROUND OF THE INVENTION

1. Field of the Invention

The present invention relates to a technology for logging into an image forming apparatus and the like by means of a wearable computer.

2. Description of the Related Art

Recent years have seen the widespread use of computers that are worn or carried on a human body for use. Such computers are called "wearable computers", "wearable terminals", or the like.

In general, one wearable computer is possessed and used by one user. Thus, the wearable computer is not so designed to be used properly by a plurality of users. For example, the wearable computer is not so designed that users can set their individual user accounts therein.

Further, such a wearable computer sometimes uses a so-called biometric authentication technology. The "biometric authentication" is a function to verify the authenticity of each user based on his/her physical characteristics (biometric information).

For example, the Nymi Band (registered trademark) by Nymi Inc. is a wristband-shaped wearable computer that is worn around user's wrist for use. The Nymi Band analyzes a user's unique electrocardiogram to authenticate the identity of the user through the biometric information (Non-Patent Document: Websites by Mash Media Inc., "Techable"; and "Nymi, biometric authentication band using heartbeat, is released to consumers this autumn" searched on Mar. 2, 2016 at http://techable.jp/archives/18291.)

The biometric authentication technology includes the following technology. A biological information collection system includes: a biological information measurement device measuring biological information; a biological information collection device authenticating a measurement-target subject depending on attribute information and also collecting the biological information measured by the biological measurement device to correlate the attribute information and the collected biological information; and a management device acquiring the attribute information and the biological information which are correlated with each other, from the biological information collection device, and holding the biological information in correlation with personal information enabling the measurement-target subject to be identified (English abstract of Japanese Laid-open Patent Publication No. 2015-150375).

An authentication apparatus detects fingerprints (biometric information authenticating a person) from a fingerprint sensor, heart rate signals (biometric information authenticating a worn site) from heart rate signal detection electrodes, and the wearing state of a band from the band in such a manner as overlapping at least a part of the detection periods. When all of the three items are authenticated, the authentication apparatus authenticates the user as a registered user. This authentication apparatus can thus authenticate the person by making the user surely wear the authentication apparatus. The authentication apparatus monitors the connecting state and the length of the band after authenticating the person so as to prevent the detachment of the authentication apparatus from the body with the user held authenticated (English abstracts of Japanese Laid-open Patent Publication Nos. 2008-073462 and 2008-073461).

An individual authentication device includes: a pulse detection part for detecting contact with a human body; a fingerprint detection sensor for detecting fingerprint information; a RAM for storing the fingerprint information of a specified person; and a control part for discriminating whether or not the fingerprint information detected by the fingerprint detection sensor and the fingerprint information stored in the RAM match on condition that the pulse detection part is in contact with the human body and authenticating the person who brought the human body detection part into contact with his own body and made the fingerprint detection sensor detect the fingerprint information as the specified person in the case that the respective pieces of the information match (English abstract of Japanese Laid-open Patent Publication No. 2005-006824).

Image forming apparatuses have come into widespread use which have various functions of copying, network printing, faxing, scanning, and file server. Such an image forming apparatus is generally called a "multifunction device" or a "Multi-Functional Peripheral (MFP)". Such an image forming apparatus is shared by users in the office or the like.

The following technology has been proposed as a technology for sharing the image forming apparatus by users.

An MFP stores a job registered from a PC. A job for proxy printing is included in such jobs. With respect to a job for proxy printing, a user who has registered the job (owner user) and a user who is permitted to print the job (permitted user) are registered in the MFP. Then, when a permitted user logs in, if a job including the user as its permitted user is registered, that effect is notified in the MFP (English abstract of Japanese Laid-open Patent Publication No. 2013-084179).

An image forming system comprises an image forming apparatus, a requester cellular phone, and a proxy cellular phone. The image forming apparatus includes: a storage section for storing authentication information and printing data; an engine section for performing printing based on the printing data; an obtaining section for obtaining identification information; and an authenticating section for performing authentication by comparing the authentication information with the identification information. The requester cellular phone for proxy printing transmits proxy request data indicating the printing data to be subjected to the proxy printing and the identification information of the requester cellular phone; The proxy cellular phone that has received the proxy request data transmits the proxy request data and the identification information of the requester cellular phone and the proxy cellular phone to the obtaining section. The image forming apparatus having the storage section in which the printing data indicated by the proxy request data exists, compares each of the identification information of the requester cellular phone and the identification information of the proxy cellular phone with the authentication information, and when authenticating that each of both information has use authority, performs printing based on the printing data indicated by the proxy request data (English abstract of Japanese Laid-open Patent Publication No. 2012-159984).

An image forming apparatus which can be operated by authenticating an operator is equipped with control means having a function to determine whether to entrust operation based on both result of the authentication by the trustee and a result obtained by reading a substitution sheet by the authenticated entrust when the user entrusts the operation to other person (English abstracts of Japanese Laid-open Patent Publication Nos. 2008-225486 and 2004-276271).

Further, the following technology has been proposed as a technology for securely sending/receiving data between devices.

A terminal device including a function for transmitting a file with a digital signature by mail comprises: a first communication unit 101 for executing communication with a terminal used by an approver when a distance from the terminal has been equal to or shorter than a predetermined distance; an acquisition unit 102 for acquiring a value which is encrypted by encryption processing executed using information communicated with the terminal device and is obtained from a file of a transmission target; and a transmission instruction unit 302 for outputting an instruction to transmit the acquired and encrypted value and the file by mail (English abstract of Japanese Laid-open Patent Publication No. 2014-121034).

As described above, wearable computers are often not designed on the assumption that a plurality of users share one wearable computer.

However, it is sometimes desired to share such a wearable computer securely by a plurality of users.

Suppose that, for example, an image forming apparatus becomes available in an office in response to the authenticity of a user verified with a wearable computer. In such an office, an employee who has forgotten to carry his/her wearable computer sometimes would like to borrow a wearable computer from another employee to use the image forming apparatus.

In such an office, an employee who does not possess a wearable computer, for example, a visiting employee or a temporary employee, sometimes would like to borrow a wearable computer from another employee to use the image forming apparatus.

Even when the employee borrows a wearable computer from another employee, he/she cannot use the wearable computer because biometric authentication is not successfully performed.

SUMMARY

The present invention has been achieved in light of such an issue, and therefore, an object of an embodiment of the present invention is to make it easy, as compared to conventional technologies, for a user to wear a wearable computer of another user to log into another device such as an image forming apparatus.

To achieve at least one of the objects mentioned above, according to an aspect, an image processing system includes an image forming apparatus and a wearable computer. The wearable computer includes a first storage portion configured to permanently store a first characteristic therein, the first characteristic representing a physical characteristic of an owner of the wearable computer; an obtaining portion configured to obtain a second characteristic, the second characteristic representing a physical characteristic of a user who wears the wearable computer; a first determination portion configured to determine whether or not the user is the owner based on the first characteristic and the second characteristic; a first request portion configured to make a first request, when the user is determined to be the owner, to allow the user to log into the image forming apparatus; a second storage portion configured to temporarily store the second characteristic therein, and a second request portion configured to make a second request, when the user is not determined to be the owner, to allow the user to log into the image forming apparatus by sending the second characteristic stored in the second storage portion to the image forming apparatus. The image forming apparatus includes a second determination portion which is configured to determine or to cause another device to determine whether or not the user is a specific user based on the second characteristic sent from the wearable computer.

Preferably, the image processing system includes a recording portion configured to perform processing for, when the user is determined to be the owner or the specific user and then a job is executed based on a command given by the user, making a record of execution of the job.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present will be described with reference to the drawings. However, the scope of the invention is not limited to the illustrated examples.

First Embodiment

Figure 1:
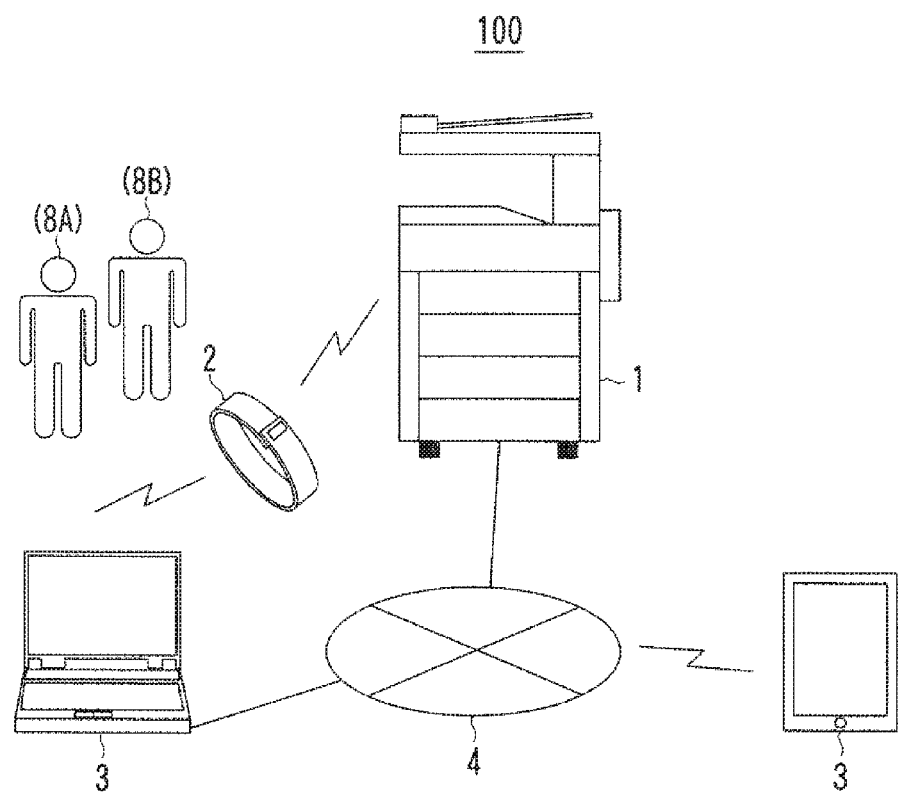
FIG. 1 is a diagram showing an example of the overall configuration of an image processing system.
Figure 2:
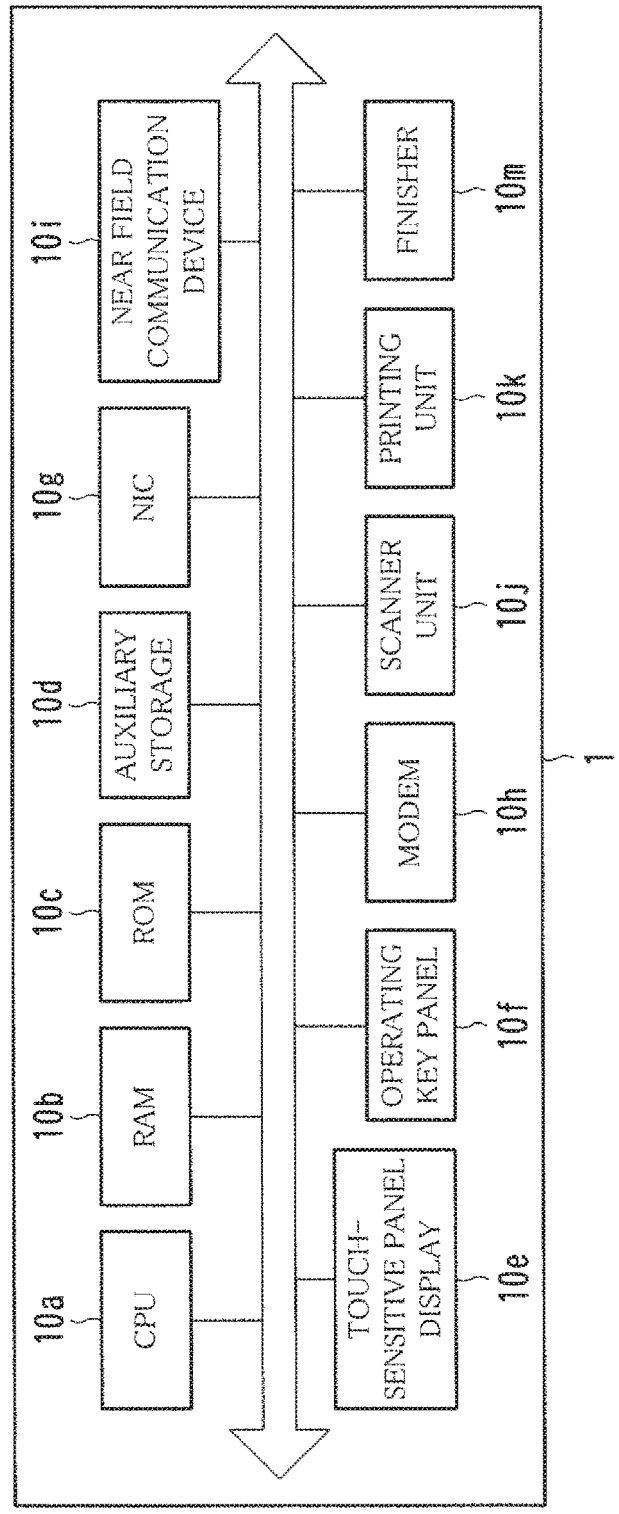
FIG. 2 is a diagram showing an example of the hardware configuration of an image forming apparatus.
Figure 3:
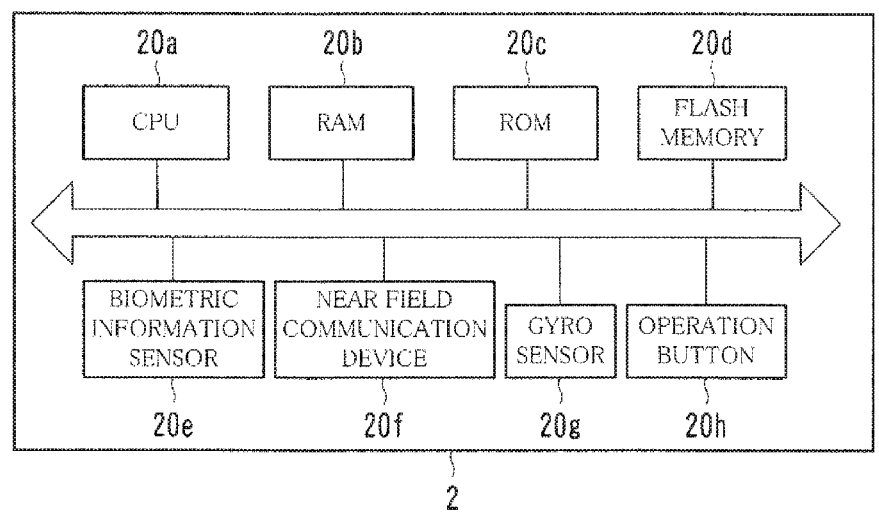
FIG. 3 is a diagram showing an example of the hardware configuration of a wearable computer.
Figure 4:
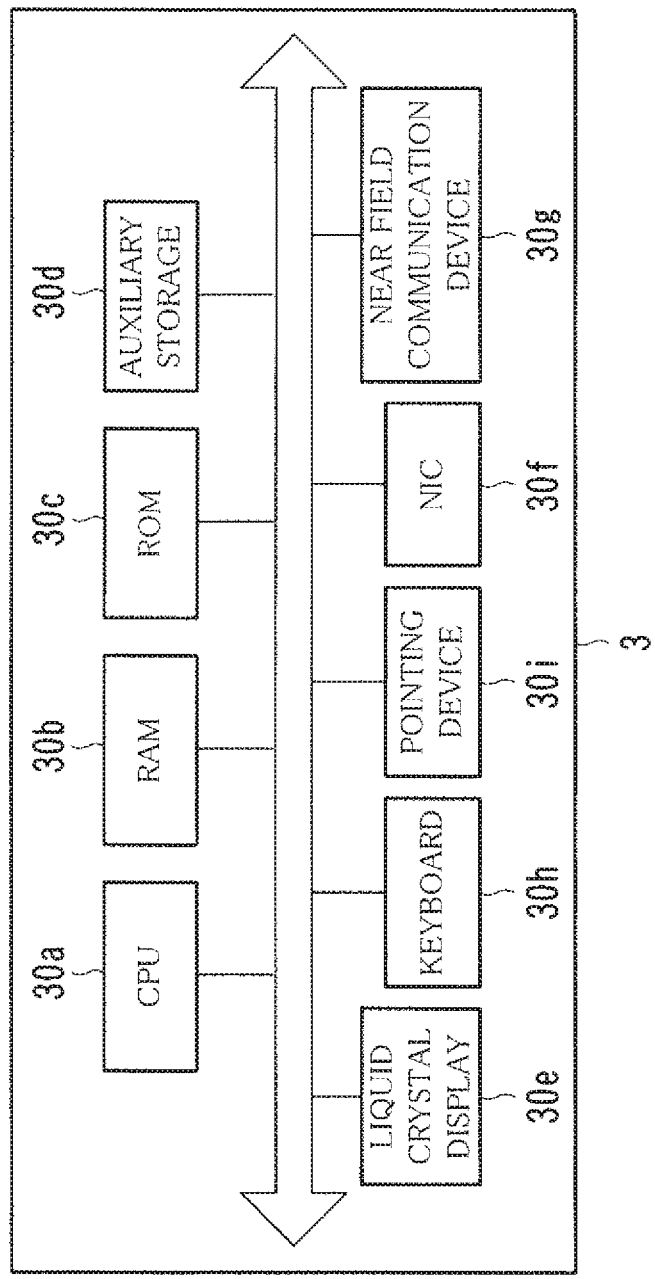
FIG. 4 is a diagram showing an example of the hardware configuration of a terminal.

FIG. 1 is a diagram showing an example of the overall configuration of an image processing system 100. FIG. 2 is a diagram showing an example of the hardware configuration of an image forming apparatus 1. FIG. 3 is a diagram showing an example of the hardware configuration of a wearable computer 2. FIG. 4 is a diagram showing an example of the hardware configuration of a terminal 3.

As shown in FIG. 1, the image processing system 100 is configured of the image forming apparatus 1, the wearable computer 2, the terminal 3, a communication line 4, and so on. The image processing system 100 performs a variety of processes related to an image.

The image processing system 100 is used by members of an organization such as a company, a government office, or a school. In short, the members of the organization are users of the image processing system 100. In principle, each of the users is given a unique identification (ID). Hereinafter, the ID is referred to as a "user code".

The image forming apparatus 1 and the terminal 3 are configured to perform communication with each other via the communication line 4. Examples of the communication line 4 are the Internet, a Local Area Network (LAN), a public line, and a dedicated line.

The wearable computer 2 is configured to perform near field communication with the image forming apparatus 1 and the terminal 3.

The image forming apparatus 1 is an apparatus into which functions such as copying, network printing, faxing, scanning, and box function are incorporated. The image forming apparatus 1 is generally called a "multifunction device" or a "Multi-Functional Peripheral (MFP)".

The network printing function is to print an image onto paper based on image data received from the terminal 3. The network printing function is sometimes called a "network printer function" or "PC print function".

According to the box function, each user is given a storage area called a "box" or a "personal box". The box function enables each user to save image data and so on to his/her storage area and to manage the same therein. The box corresponds to a "folder" or a "directory" in a personal computer.

Referring to FIG. 2, the image forming apparatus 1 is configured of a Central Processing Unit (CPU) 10a, a Random Access Memory (RAM) 10b, a Read Only Memory (ROM) 10c, an auxiliary storage 10d, a touch-sensitive panel display 10e, an operating key panel 10f, a Network Interface Card (NIC) 10g, a modem 10h, a near field communication device 10i, a scanner unit 10j, a printing unit 10k, a finisher 10m, and so on.

The touch-sensitive panel display 10e displays, for example, a screen for presenting messages to a user, a screen for allowing the user to input commands or information, a screen for showing the results of processing executed by the CPU 10a. The touch-sensitive panel display 10e sends a signal indicating a touched location to the CPU 10a.

The operating key panel 10f is a so-called hardware keyboard. The operating key panel 10f has numeric keys, a start key, a stop key, and a function key.

The NIC 10g performs communication with the terminal 3 or the like in accordance with a protocol such as Transmission Control Protocol/Internet Protocol (TCP/IP).

The modem 10h sends and receives image data with a facsimile terminal in accordance with a protocol such as G3.

The near field communication device 10i performs communication by using radio waves travelling a few centimeters through a dozen centimeters or so. The near field communication device 10i is, for example, a device which meets the standard of Near Field Communication (NFC).

The scanner unit 10j optically reads an image recorded on a sheet of paper placed on a platen glass to generate image data thereof.

The printing unit 10k prints, onto paper, an image captured by the scanner unit 10j and an image sent by a facsimile terminal or the terminal 3 by using the NIC 10g, the near field communication device 10i, or the modem 10h.

The finisher 10m applies a finish to paper onto which the printing unit 10k has printed an image, namely, a printed matter. The finish includes stapling the printed matter with a stapler, punching a hole in the printed matter, and folding the printed matter.

Figure 5:
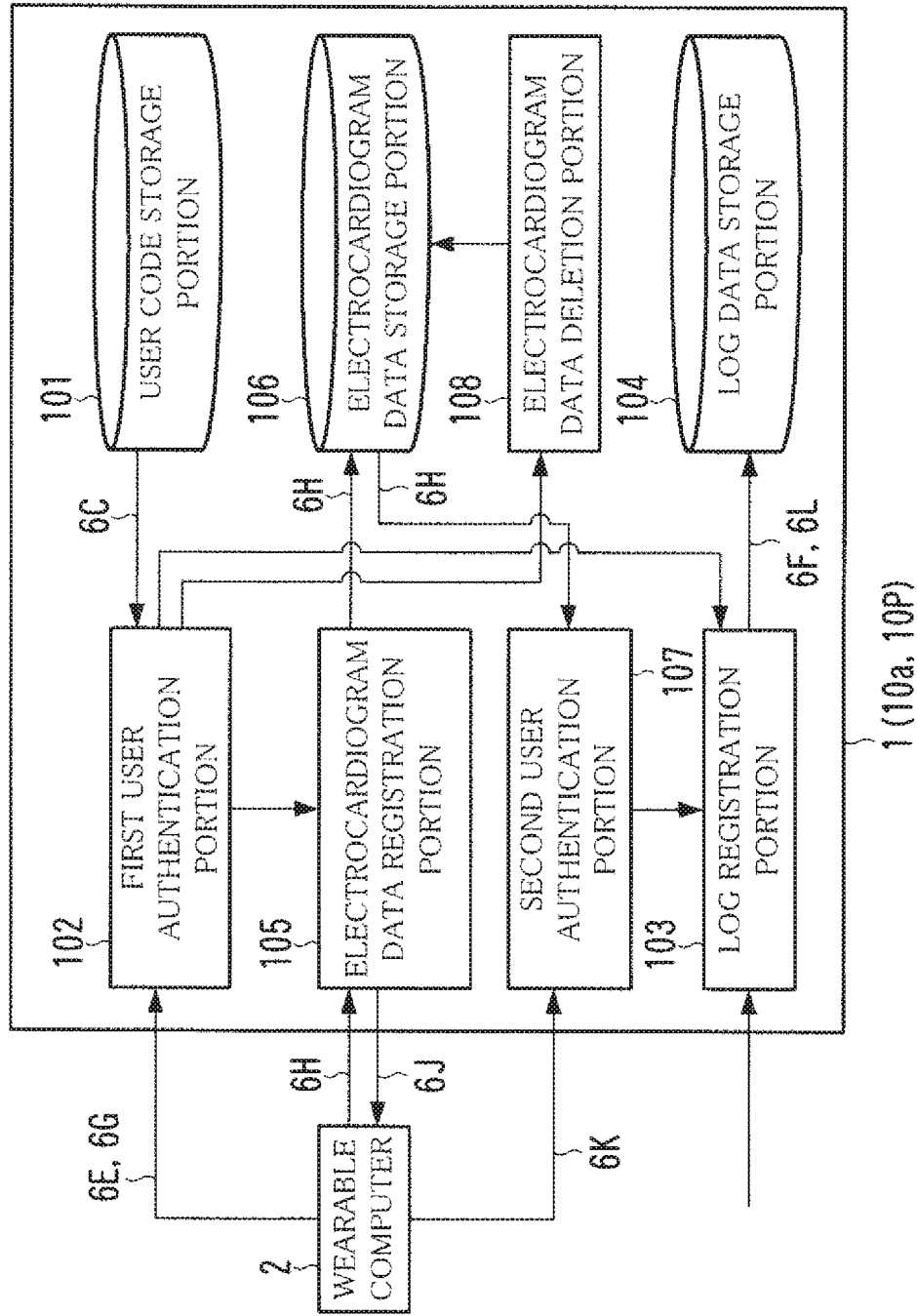
FIG. 5 is a diagram showing an example of the functional configuration of an image forming apparatus.

The ROM 10c or the auxiliary storage 10d stores, therein, a program for implementing different types of jobs involving using the copy function and so on. The ROM 10c or the auxiliary storage 10d also stores, therein, a usage management program 10P (FIG. 5). The usage management program 10P is to manage the use of the image forming apparatus 1 by the user.

The programs are loaded into the RAM 10b as necessary, and are executed by the CPU 10a. The auxiliary storage 10d is, for example, a hard disk drive or a Solid State Drive (SSD).

The wearable computer 2 is a computer that is worn by the user for use. The wearable computer 2 is sometimes called a "wearable terminal" or a "wearable device". In this embodiment, the wearable computer 2 is a device equipped with a function to measure user's body to obtain information representing his/her physical characteristics (biometric information).

Hereinafter, an example is described in which the wearable computer 2 is a wristband-shaped wearable computer worn around user's wrist for use. Such a wristband-shaped wearable computer is, for example, Nymi Band by Nymi Inc.

In principle, each member of an organization is given the wearable computer 2. The wearable computer 2 is used for the user to log into the image forming apparatus 1.

Referring to FIG. 3, the wearable computer 2 is configured of a CPU 20a, a RAM 20b, a ROM 20c, a flash memory 20d, a biometric information sensor 20e, a near field communication device 20f, a gyro sensor 20g, an operation button 20h, and so on.

The biometric information sensor 20e obtains an electrocardiogram (characteristics such as heartbeat) by making a record of cardiac action potential or cardiac action current of the user who wears the wearable computer 2 around his/her wrist.

The near field communication device 20f performs communication by using radio waves travelling a few centimeters through a dozen centimeters or so. The near field communication device 20f is, for example, a device which has the same standard as that of the near field communication device 10l of the image forming apparatus 1.

The gyro sensor 20g detects the posture of the wearable computer 2 and a change in the posture thereof.

The ROM 20c or the flash memory 20d stores an authentication program 20P (FIG. 6) therein.

The authentication program 20P enables an owner of the wearable computer 2 to lend the wearable computer 2 to another user, and enables that another user to use the wearable computer 2 to log into the image forming apparatus 1. Hereinafter, a service which makes it possible to log into the image forming apparatus 1 by means of the wearable computer 2 borrowed from the owner is referred to as a "borrowed band login service".

The authentication program 20P is loaded into the RAM 20b and is executed by the CPU 20a.

The terminal 3 is a client for remotely using the foregoing functions of the image forming apparatus 1. The user also can remotely access the image forming apparatus 1 to use the terminal 3 as an input device of the image forming apparatus 1 instead of the touch-sensitive panel display 10e and the operating key panel 10f.

The terminal 3 executes, in place of the wearable computer 2, a part of the processing for the borrowed band login service.

Examples of the terminal 3 include a personal computer, a tablet computer, and a smartphone. The description is provided below by taking an example in which the terminal 3 is a personal computer.

Referring to FIG. 4, the terminal 3 is configured of a CPU 30a, a RAM 30b, a ROM 30c, an auxiliary storage 30d, a liquid crystal display 30e, an NIC 30f, a near field communication device 30g, a keyboard 30h, a pointing device 30i, and so on.

The liquid crystal display 30e displays, for example, a screen for a document which is to be printed and a screen for print command.

The NIC 30f performs communication with the image forming apparatus 1 or the like in accordance with a protocol such as TCP/IP.

The near field communication device 30g performs communication by using radio waves travelling a few centimeters through a dozen centimeters or so. The near field communication device 30g is, for example, a device which has the same standard as that of the near field communication device 20f of the wearable computer 2.

The keyboard 30h and the pointing device 30i are used for the user to enter information and commands.

The ROM 30c or the auxiliary storage 30d stores, therein, an operating system, different types of application programs, a registration assistance program 30P, and so on. The registration assistance program 30P is to execute partial processing for the borrowed band login service.

The programs are loaded into the RAM 30b as necessary, and are executed by the CPU 30a. The auxiliary storage 30d is, for example, a hard disk drive or an SSD.

Figure 6:
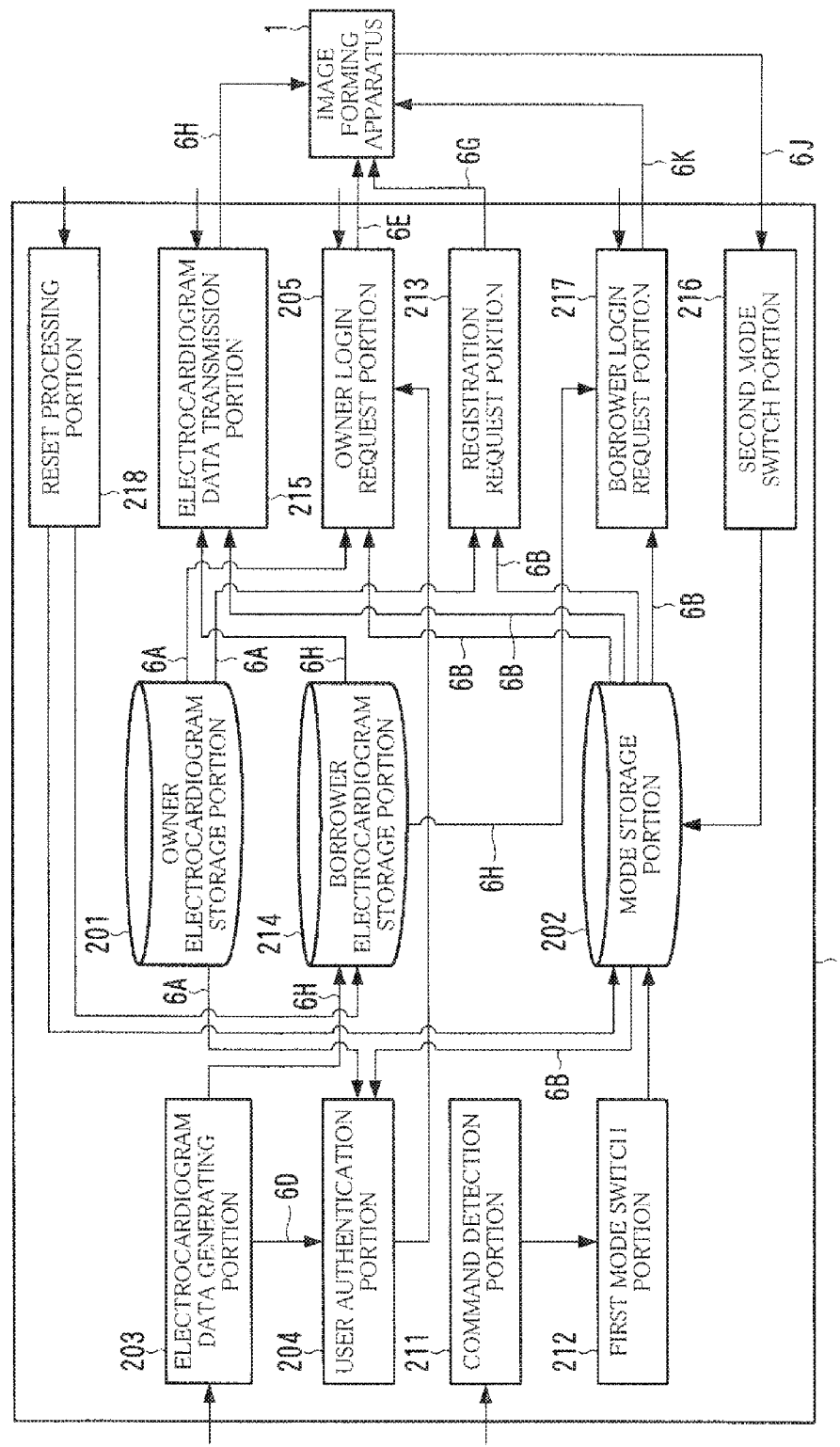
FIG. 6 is a diagram showing an example of the functional configuration of a wearable computer.

FIG. 5 is a diagram showing an example of the functional configuration of the image forming apparatus 1. FIG. 6 is a diagram showing an example of the functional configuration of the wearable computer 2.

The description goes on to a mechanism for providing the borrowed band login service with reference to FIGS. 5 and 6.

The usage management program 10P implements, in the image forming apparatus 1, the functions of a user code storage portion 101, a first user authentication portion 102, a log registration portion 103, a log data storage portion 104, an electrocardiogram data registration portion 105, an electrocardiogram data storage portion 106, a second user authentication portion 107, an electrocardiogram data deletion portion 108, and so on, all of which are shown in FIG. 5.

The authentication program 20P implements, in the wearable computer 2, the functions of an owner electrocardiogram storage portion 201, a mode storage portion 202, an electrocardiogram data generating portion 203, a user authentication portion 204, an owner login request portion 205, a command detection portion 211, a first mode switch portion 212, a registration request portion 213, a borrower electrocardiogram storage portion 214, an electrocardiogram data transmission portion 215, a second mode switch portion 216, a borrower login request portion 217, a reset processing portion 218, and so on, all of which are shown in FIG. 6.

With the wearable computer 2, the owner electrocardiogram storage portion 201 stores, in advance, owner electrocardiogram data 6A showing an electrocardiogram of a user who is the owner of the wearable computer 2 and a user code of the user. The owner electrocardiogram data 6A is permanently stored in the owner electrocardiogram storage portion 201 unless the owner changes.

The wearable computer 2 is worn around the user's wrist, so that the electrocardiogram can be obtained by the biometric information sensor 20e. Alternatively, the electrocardiogram can be entered from another device.

The mode storage portion 202 stores, in advance, mode data 6B indicating the current mode of the wearable computer 2.

The wearable computer 2 has a normal mode, a borrower registration mode, and a borrower service mode.

The "normal mode" is a mode for the owner of the wearable computer 2 to use the image forming apparatus 1.

The "borrower registration mode" is a mode in which setting is so made that a person who borrowed the wearable computer 2 from the owner can use the wearable computer 2. Such a person is hereinafter called a "borrower".

The "borrower service mode" is a mode for the borrower of the wearable computer 2 to use the image forming apparatus 1.

The mode data 6B indicates the normal mode as the initial value. Updating the mode data 6B is described later.

With the image forming apparatus 1, the user code storage portion 101 stores, in advance, a user code table 6C containing user codes on a user-by-user basis. The user is herein a member of the organization.

[Processing for the Case where the Owner Uses the Wearable Computer 2]

Figure 7:
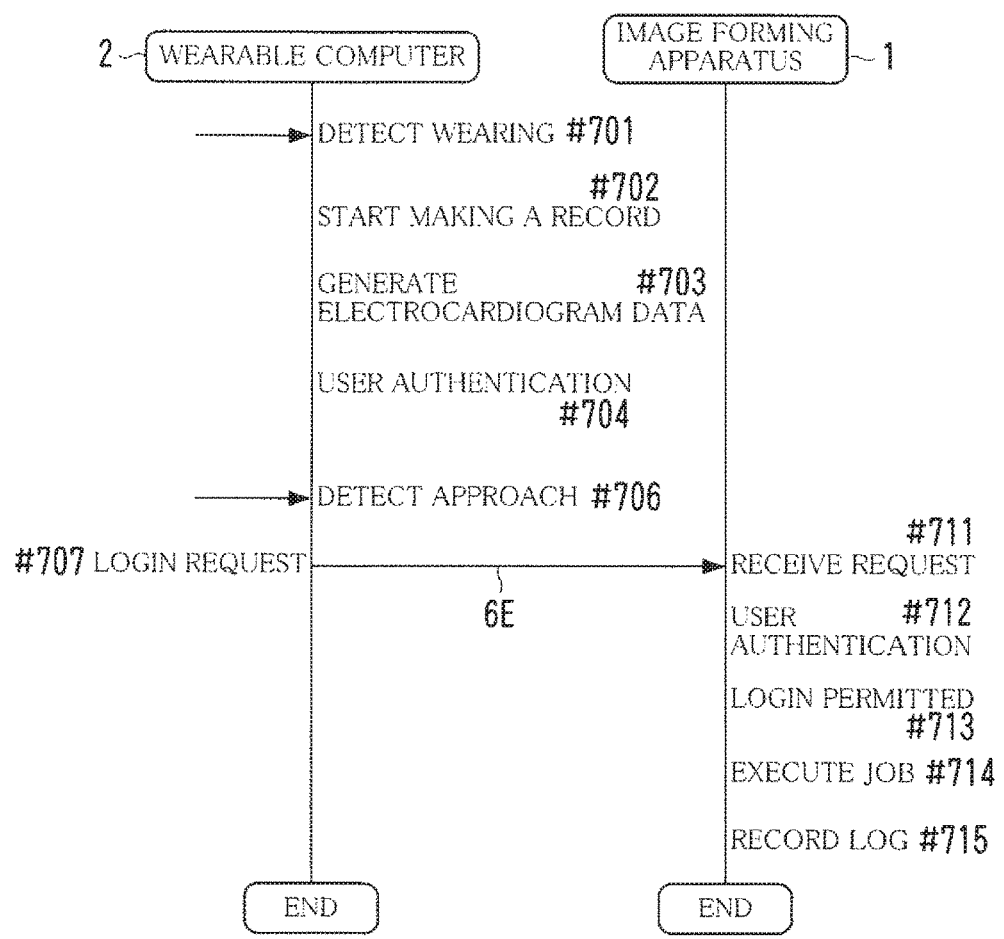
FIG. 7 is a sequence diagram depicting an example of the flow of processing performed by each device for the case where an owner uses a wearable computer.

FIG. 7 is a sequence diagram depicting an example of the flow of processing performed by each device for the case where the owner uses the wearable computer 2.

Where the owner uses the wearable computer 2, the individual portions of the image forming apparatus 1 and the individual portions of the wearable computer 2 perform processing in the steps as shown in FIG. 7. The processing is detailed below by taking an example in which a user 8A uses his/her wearable computer 2.

The user 8A wears the wearable computer 2 around his/her wrist. When it is detected that the subject wearable computer 2 is worn (Step #701 of FIG. 7), the biometric information sensor 20e starts recording the cardiac action potential or the cardiac action current (Step #702).

Where the normal mode is indicated in the mode data 6B, the electrocardiogram data generating portion 203 generates electrocardiogram data 6D showing an electrocardiogram of the person who wears the wearable computer 2, herein, the user 8A, based on the action potential or action current recorded by the biometric information sensor 20e (Step #703).

Where the normal mode is indicated in the mode data 6B, the user authentication portion 204 uses a known method to compare the electrocardiogram shown in the owner electrocardiogram data 6A and the electrocardiogram shown in the electrocardiogram data 6D to determine whether or not the two electrocardiograms correspond to the same person (Step #704). In short, the user authentication portion 204 performs user authentication. If the two electrocardiograms correspond to the same person, then it proves that the user currently wearing the wearable computer 2 is the owner of the wearable computer 2.

If it is determined that the two electrocardiograms correspond to the same person, that is to say, if the user 8A is successfully authenticated, then the user 8A moves to the installation site of the image forming apparatus 1 without removing the wearable computer 2 from him/her, namely, with the wearable computer 2 worn. The user then moves the wearable computer 2 closer to the near field communication device 10i of the image forming apparatus 1.

If the user authentication fails, then the processing described below is not performed. The user 8A is thus not permitted to use the wearable computer 2.

The near field communication device 20f detects the wearable computer 2 moving closer to the near field communication device 10i (Step #706). At this time, if the mode data 6B indicates the normal mode, and further, if the wearable computer 2 is still worn by the user 8A even after the successful user authentication, then the owner login request portion 205 sends owner login request data 6E to the image forming apparatus 1 by means of the near field communication device 20f (Step #707).

The owner login request data 6E shows a user code indicated in the owner electrocardiogram data 6A, namely, the user code of the user 8A, the normal mode set as the current mode, and a login request.

With the image forming apparatus 1, when the near field communication device 10i receives the owner login request data 6E (Step #711), the first user authentication portion 102 performs user authentication in the following manner (Step #712).

The first user authentication portion 102 determines whether or not the user code indicated in the owner login request data 6E is contained in the user code table 6C stored in the user code storage portion 101. If the determination is positive, then the first user authentication portion 102 determines that the user of the wearable computer 2, i.e., the user 8A, is the owner of the wearable computer 2.

When determining that the user BA is the owner of the wearable computer 2, the first user authentication portion 102 allows the user 8A to log into the image forming apparatus 1 as the owner of the wearable computer 2 (Step #713).

This enables the user 8A to instruct the image forming apparatus 1 to execute a variety of jobs until the user 8A logs out of the image forming apparatus 1.

The individual portions of the image forming apparatus 1, e.g., the NIC 10g, the modem 10h, the scanner unit 10j, the printing unit 10k, and the finisher 10m, execute a job based on a command given by the user 8A (Step #714).

When the job is executed based on the command given by the owner, the log registration portion 103 generates log data 6F to store the same into the log data storage portion 104 (Step #715).

The log data 6F indicates the user code of the user 8A and the content of the job, e.g., the number of sheets printed, color printing or monochrome printing, communication destination, and time required for the communication. The log data 6F is used for billing calculation.

[Processing for the Case where a Borrower Uses the Wearable Computer 2]

Figure 8:
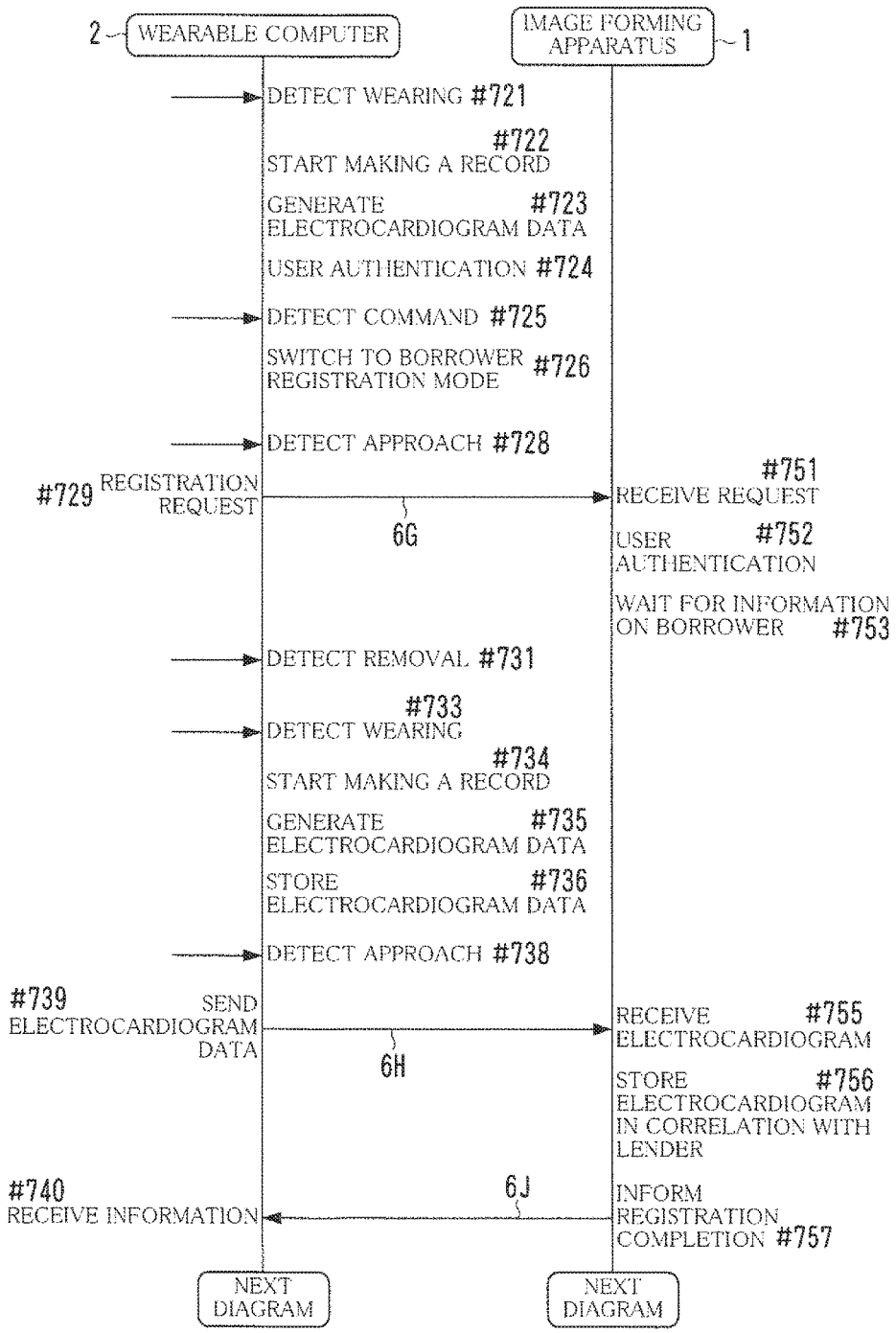
FIG. 8 is a sequence diagram depicting an example of the flow of processing performed by each device for the case where a borrower uses a wearable computer.
Figure 9:
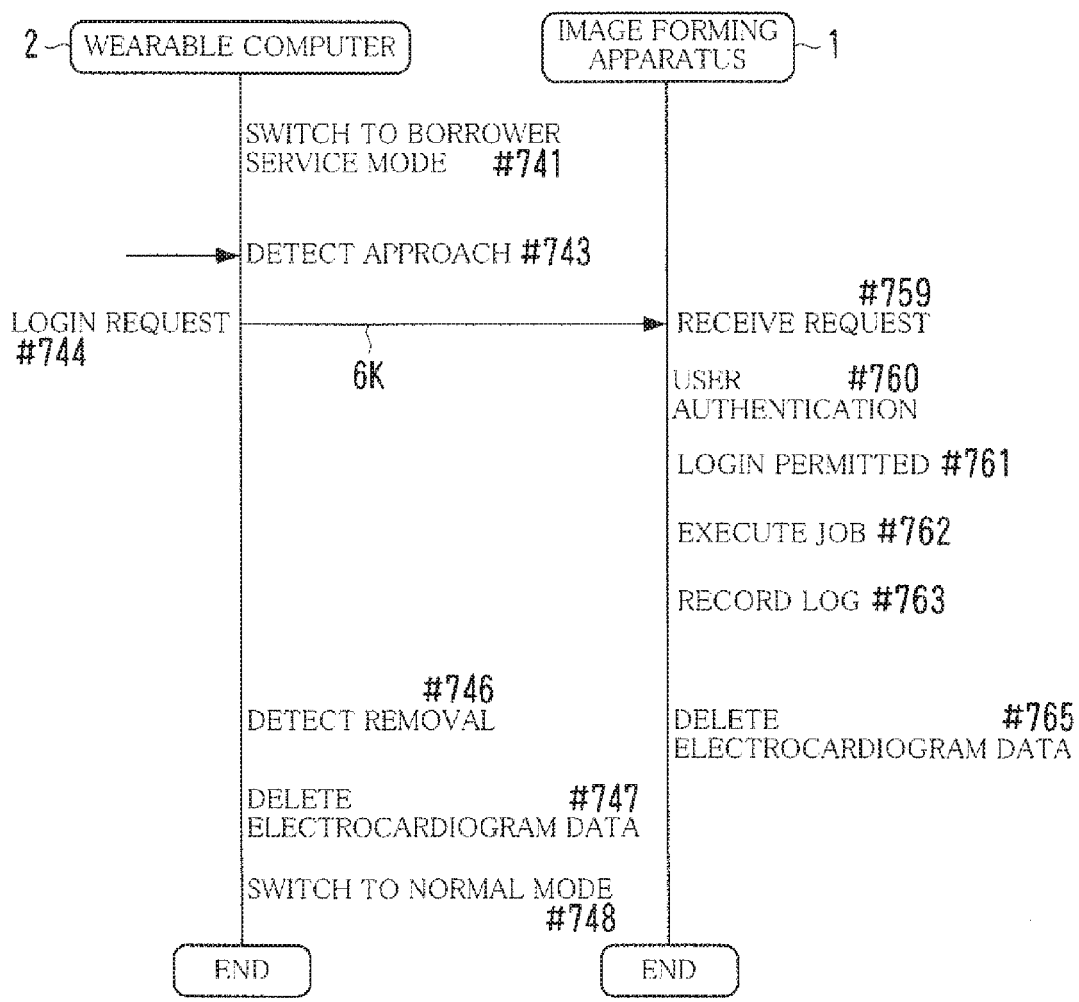
FIG. 9 is a sequence diagram depicting an example of the flow of processing performed by each device for the case where a borrower uses a wearable computer.

FIGS. 8 and 9 are sequence diagrams depicting an example of the flow of processing performed by each device for the case where a borrower uses the wearable computer 2.

A user borrows the wearable computer 2 from another user, and can use the wearable computer 2 to log into the image forming apparatus 1. The user can cause the image forming apparatus 1 to execute a job. The mechanism thereof is described below by taking an example in which the user 8A lends his/her wearable computer 2 to a user 8B.

The individual portions of the image forming apparatus 1 and the individual portions of the wearable computer 2 perform processing in the steps as depicted in FIGS. 8 and 9.

(1) Preparation

A lending person who lends the wearable computer 2, namely, the user 8A, wears the wearable computer 2. In response to the wearable computer 2 worn, the biometric information sensor 20e, the electrocardiogram data generating portion 203, and the user authentication portion 204 perform (Steps #721 through #724 of FIG. 8) the same processing as that in Steps #701 through #704 of FIG. 7. To be specific, when the biometric information sensor 20e detects the wearable computer 2 worn, the electrocardiogram data generating portion 203 generates electrocardiogram data 6D for the user 8A and the user authentication portion 204 performs user authentication.

In order for the user 8A to cause the image forming apparatus 1 to execute a job, the user 8A moves the wearable computer 2 closer to the near field communication device 10i of the image forming apparatus 1 as described earlier.

In order for the user 8A to lend the wearable computer 2 to another user, the user 8A performs predetermined operation for switching the mode to a borrower registration mode.

For example, the user 8A waves his/her arm around which the wearable computer 2 is worn predetermined number of times, for example, three times. The gyro sensor 20g detects the arm movement. It is noted that the movement is preferably to wave the arm in a particular direction (from side to side, for example) to enable the gyro sensor 20g to distinguish the movement from arm swing when walking. Alternatively, it is possible to make the wave speed and the wave width different from the speed and the wave width of arm swing when walking.

Alternatively, the user 8A continuously performs processing of holding down, touching, and holding down a particular button of the operation button 20h. The "holding down" is to press the particular button for one to two seconds. The "touching" is to press the particular button for 0.1 to 0.5 seconds. The operation button 20h detects the operation.

In response to the predetermined operation detected by the gyro sensor 20g or the operation button 20h, the command detection portion 211 detects a command to switch to the borrower registration mode being inputted (Step #725). Hereinafter, such a command is referred to as a "switch command".

When the command detection portion 211 detects the switch command, the first mode switch portion 212 updates the mode data 6B stored in the mode storage portion 202 so as to indicate the borrower registration mode (Step #726). Thereby, the mode is switched to the borrower registration mode.

The user 8A moves to the installation site of the image forming apparatus 1 with the wearable computer 2 worn, and moves the wearable computer 2 closer to the near field communication device 10i of the image forming apparatus 1.

The near field communication device 20f detects the wearable computer 2 moving closer to the near field communication device 10i (Step #728). At this time, if the mode data 6B indicates the borrower registration mode, and further, if the wearable computer 2 is still worn by the user 8A even after the successful user authentication, then the registration request portion 213 sends registration request data 6G to the image forming apparatus 1 by means of the near field communication device 20f (Step #729).

The registration request data 6G shows a user code indicated in the owner electrocardiogram data 6A, namely, the user code of the user 8A, and a registration request.

With the image forming apparatus 1, when the near field communication device 10i receives the registration request data 6G (Step #751), the first user authentication portion 102 performs user authentication by determining whether or not the user code indicated in the registration request data 6G is contained in the user code table 6C as described earlier in Step #712 of FIG. 7 (Step #752).

When the user authentication is successful, the electrocardiogram data registration portion 105 performs registration processing for enabling a borrower (user 8B, herein) to use the image forming apparatus 1 in the following manner. In contrast, when the user authentication fails, the registration processing is not performed.

The electrocardiogram data registration portion 105 waits, for a predetermined amount of time (five minutes, for example), for the wearable computer 2 to send electrocardiogram data (Step #753).

The user 8A removes the wearable computer 2 from him/her to lend the wearable computer 2 to the user BE. In response, the biometric information sensor 20e of the wearable computer 2 detects the removal of the subject wearable computer 2 from the user BA (Step #731).

The user 8B wears the wearable computer 2 around his/her wrist. When it is detected that the subject wearable computer 2 is worn (Step #733), the biometric information sensor 20e starts recording the cardiac action potential or the cardiac action current (Step #734).

Where the borrower registration mode is indicated in the mode data 6B, the electrocardiogram data generating portion 203 generates electrocardiogram data 6H (Step #735) to store the same into the borrower electrocardiogram storage portion 214 (Step #736).

The electrocardiogram data 6H indicates an electrocardiogram obtained based on the action potential or the action current recorded by the biometric information sensor 20e, namely, an electrocardiogram of the user 8B, and a user code of a person who lends, namely, the user BA. The code of the person who lends the wearable computer 2 is indicated in the owner electrocardiogram data 6A stored in the user code storage portion 101.

The user 8B then moves the wearable computer 2 closer to the near field communication device 10i of the image forming apparatus 1.

The near field communication device 20f detects the wearable computer 2 moving closer to the near field communication device 10i (Step #738). At this time, if the mode data 6B indicates the borrower registration mode, and further, if the user authentication is not performed after the wearable computer 2 is worn, then the electrocardiogram data transmission portion 215 sends the electrocardiogram data 6H to the image forming apparatus 1 by means of the near field communication device 20f (Step #739).

With the image forming apparatus 1, when the electrocardiogram data registration portion 105 receives the electrocardiogram data 6H (Step #755) before a predetermined amount of time has elapsed since the waiting started in Step #753, the electrocardiogram data registration portion 105 stores the electrocardiogram data 6H into the electrocardiogram data storage portion 106 (Step #756).

The electrocardiogram data registration portion 105 then sends completion notice data 6J for informing the completion of registration to the wearable computer 2 (Step #757).

With the wearable computer 2, the second mode switch portion 216 receives the completion notice data 6J (Step #740) and updates the mode data 6B stored in the mode storage portion 202 so that the borrower service mode is indicated therein (Step #741 of FIG. 9). This switches the mode to the borrower service mode.

By the processing described above, preparation for the user 8B to log into the image forming apparatus 1 is completed.

(2) Use of the Image Forming Apparatus 1

After the mode of the wearable computer 2 is switched to the borrower service mode, the user 8B moves the wearable computer 2 away from the near field communication device 10i so as to disable communication therewith. After that, the user 8B moves again the wearable computer 2 closer to the near field communication device 10i.

The near field communication device 20f detects the approach of the wearable computer 2 to the near field communication device 10i (Step #743). At this time, if the mode data 6B indicates the borrower service mode, and further, if the wearable computer 2 is still worn by the user even after the successful user authentication, the borrower login request portion 217 sends borrower login request data 6K to the image forming apparatus 1 by means of the near field communication device 20f (Step #744).

The borrower login request data 6K indicates an electrocardiogram of the borrower, namely, the user 8B, the borrower service mode set as the current mode, and a login request. The electrocardiogram is the same as that indicated in the electrocardiogram data 6H stored in the borrower electrocardiogram storage portion 214.

With the image forming apparatus 1, when the near field communication device 10i receives the borrower login request data 6K (Step #759), the second user authentication portion 107 performs user authentication in the following manner (Step #760).

The second user authentication portion 107 uses a known method to compare the electrocardiogram shown in the borrower login request data 6K and the electrocardiogram shown in the electrocardiogram data 6H stored in the electrocardiogram data storage portion 106 to determine whether or not the two electrocardiograms correspond to the same person (Step #761). In short, the second user authentication portion 107 performs user authentication.

If it is determined that the two electrocardiograms correspond to the same person, that is to say, if the user is successfully authenticated, then the user 8B is permitted to log into the image forming apparatus 1 as the borrower of the wearable computer 2 (Step #761).

This enables the user 8B to instruct the image forming apparatus 1 to execute a variety of jobs until the user 8B logs out of the image forming apparatus 1.

The individual portions of the image forming apparatus 1 execute a job based on a command given by the user 8B (Step #762).

Where the borrower logs in the image forming apparatus 1, the log registration portion 103 generates log data 6L to store the same into the log data storage portion 104 (Step #763). As with the log data 6F, the log data 6L is also used for billing calculation.

As with the log data 6F, the log data 6L indicates the content of the job. The log data 6L also indicates the user code of the lender (owner) of the wearable computer 2. The user code is the same as that indicated in the electrocardiogram data 6H used for the user authentication.

If the user authentication fails, the user 8B is not permitted to log into the image forming apparatus 1. The user 8B thus cannot cause the image forming apparatus 1 to execute a job.

(3) Reset

When the user 8B does not need to use the image forming apparatus 1 anymore, he/she removes the wearable computer 2 from his/her wrist.

With the wearable computer 2, the biometric information sensor 20e detects the removal of the subject wearable computer 2 from the user 8B (Step #746). When the mode data 6B indicates the borrower service mode, the reset processing portion 218 performs processing (reset processing) for terminating the lending in the following manner.

The reset processing portion 218 deletes the electrocardiogram data 6H from the borrower electrocardiogram storage portion 214 (Step #747). The reset processing portion 218 then updates the mode data 6B so as to show the normal mode (Step #748).

With the image forming apparatus 1, the electrocardiogram data deletion portion 108 deletes the electrocardiogram data 6H from the electrocardiogram data storage portion 106 at a predetermined time (Step #749). For example, when the owner of the wearable computer 2 logs into the image forming apparatus 1 next time, the electrocardiogram data deletion portion 108 deletes the electrocardiogram data 6H indicating the user code of the owner. Alternatively, when a predetermined amount of time (six hours, for example) has elapsed since the electrocardiogram data 6H was stored in the electrocardiogram data storage portion 106, the electrocardiogram data deletion portion 108 deletes the electrocardiogram data 6H from the electrocardiogram data storage portion 106. The predetermined amount of time may be determined by the owner of the wearable computer 2, or, may be preset in the image forming apparatus 1.

(4) Variation of Preparation

Figure 10:
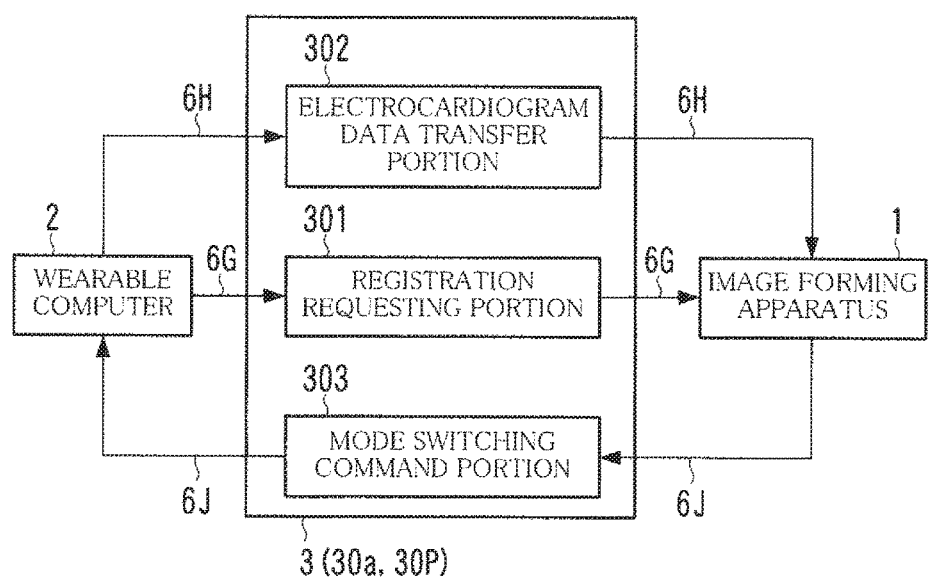
FIG. 10 is a diagram showing an example of the functional configuration of a terminal.

FIG. 10 is a diagram showing an example of the functional configuration of the terminal 3.

According to the foregoing "(1) preparation", the user 8A and the user 8B have to go to the installation site of the image forming apparatus 1 in order to make preparation for enabling the user 8B to log into the image forming apparatus 1 by means of the wearable computer 2.

Instead of this, however, the user BA and the user 8B can make such preparation remotely through the terminal 3 without going to the installation site of the image forming apparatus 1. The mechanism thereof is described below by taking an example in which the user 8A lends his/her wearable computer 2 to the user 8B.

The registration assistance program 30P implements, in the terminal 3, the functions of a registration requesting portion 301, an electrocardiogram data transfer portion 302, and a mode switching command portion 303, all of which are shown in FIG. 10.

The user 8A runs, in advance, the registration assistance program 30P on the terminal 3. The user 8A wears the wearable computer 2 and performs the predetermined operation for switching to the borrower registration mode, for example, swings his/her arm or presses the operation button 20h.

In response to the operation, the mode of the wearable computer 2 is switched to the borrower registration mode as described above.

The user 8A moves the wearable computer 2 closer to the near field communication device 30g of the terminal 3.

With the wearable computer 2, when it is detected that the wearable computer 2 approaches the near field communication device 30g, the registration request portion 213 (FIG. 6) sends the registration request data 6G to the terminal 3 rather than the image forming apparatus 1 by means of the near field communication device 20f.

With the terminal 3, the registration requesting portion 301 requests the image forming apparatus 1 to start registration processing for the borrower by transferring the registration request data 6G through the communication line 4 to the image forming apparatus 1 by means of the NIC 30f.

With the image forming apparatus 1, the first user authentication portion 102 performs user authentication based on the registration request data 6G. If the user authentication is successful, then the electrocardiogram data registration portion 105 (FIG. 5) waits for the terminal 3 to send electrocardiogram data for a predetermined amount of time.

The user 8A removes the wearable computer 2 from him/her to lend the same to the user BE. The user 8B then wears the wearable computer 2 around his/her wrist.

In response, with the wearable computer 2, the electrocardiogram data 6H is generated and is stored into the borrower electrocardiogram storage portion 214 in the method as depicted in Steps #731 through #736 of FIG. 8.

The user 8B moves the wearable computer 2 closer to the near field communication device 30g of the terminal 3.

In response, the electrocardiogram data transmission portion 215 sends the electrocardiogram data 6H to the terminal 3 rather than the image forming apparatus 1 by means of the near field communication device 20f.

With the terminal 3, the electrocardiogram data transfer portion 302 receives the electrocardiogram data 6H from the wearable computer 2 and transfers the same through the communication line 4 to the image forming apparatus 1 by means of the NIC 30f.

With the image forming apparatus 1, when the electrocardiogram data registration portion 105 receives the electrocardiogram data 6H before a predetermine amount of time has elapsed since the waiting starts, the electrocardiogram data registration portion 105 stores the electrocardiogram data 6H into the electrocardiogram data storage portion 106. The electrocardiogram data registration portion 105 then sends the completion notice data 6J through the communication line 4 to the terminal 3 by means of the NIC 10g.

With the terminal 3, the mode switching command portion 303 receives the completion notice data 6J from the image forming apparatus 1 and transfers the same to the wearable computer 2 by means of the near field communication device 30g. This gives a switch command to the wearable computer 2.

With the wearable computer 2, the second mode switch portion 216 receives the completion notice data 6J from the terminal 3 and updates the mode data 6B stored in the mode storage portion 202 so that the borrower service mode is indicated therein. This switches the mode to the borrower service mode.

By the processing described above, preparation for the user 8B to log into the image forming apparatus 1 by means of the terminal 3 is completed.

Figure 11:
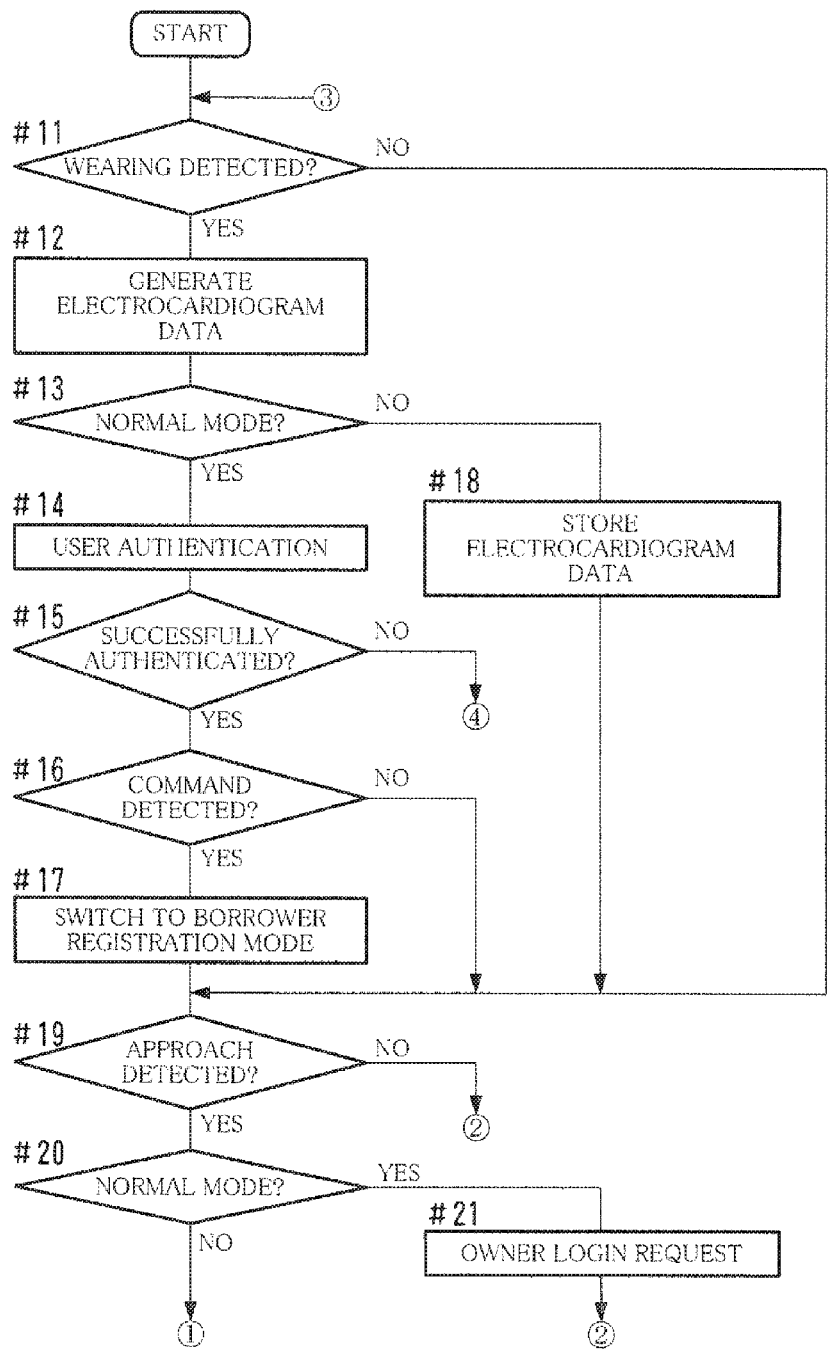
FIG. 11 is a flowchart depicting an example of the flow of the entire processing by a wearable computer.
Figure 12:
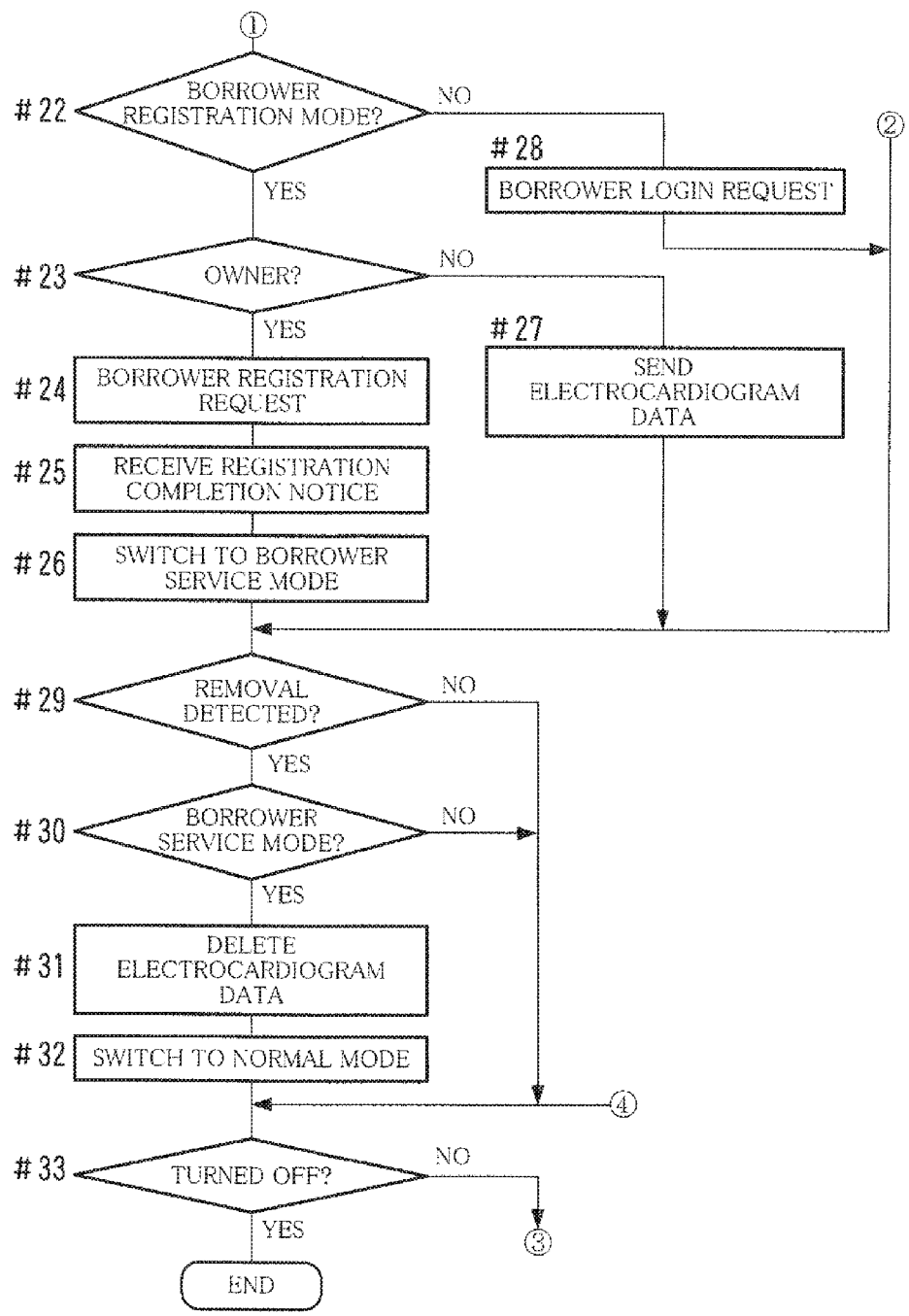
FIG. 12 is a flowchart depicting an example of the flow of the entire processing by a wearable computer.
Figure 13:
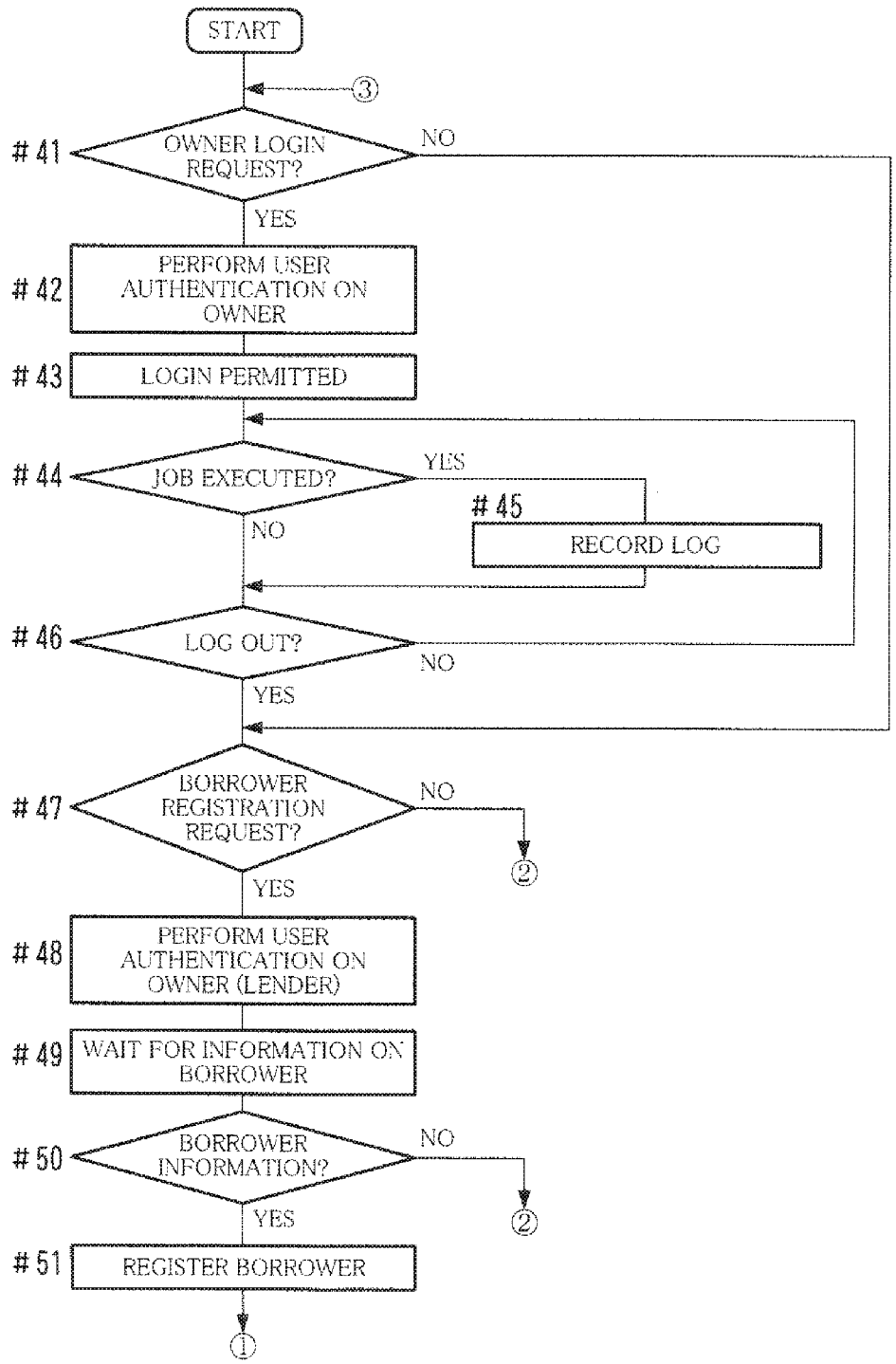
FIG. 13 is a flowchart depicting an example of the flow of the entire processing by an image forming apparatus.
Figure 14:
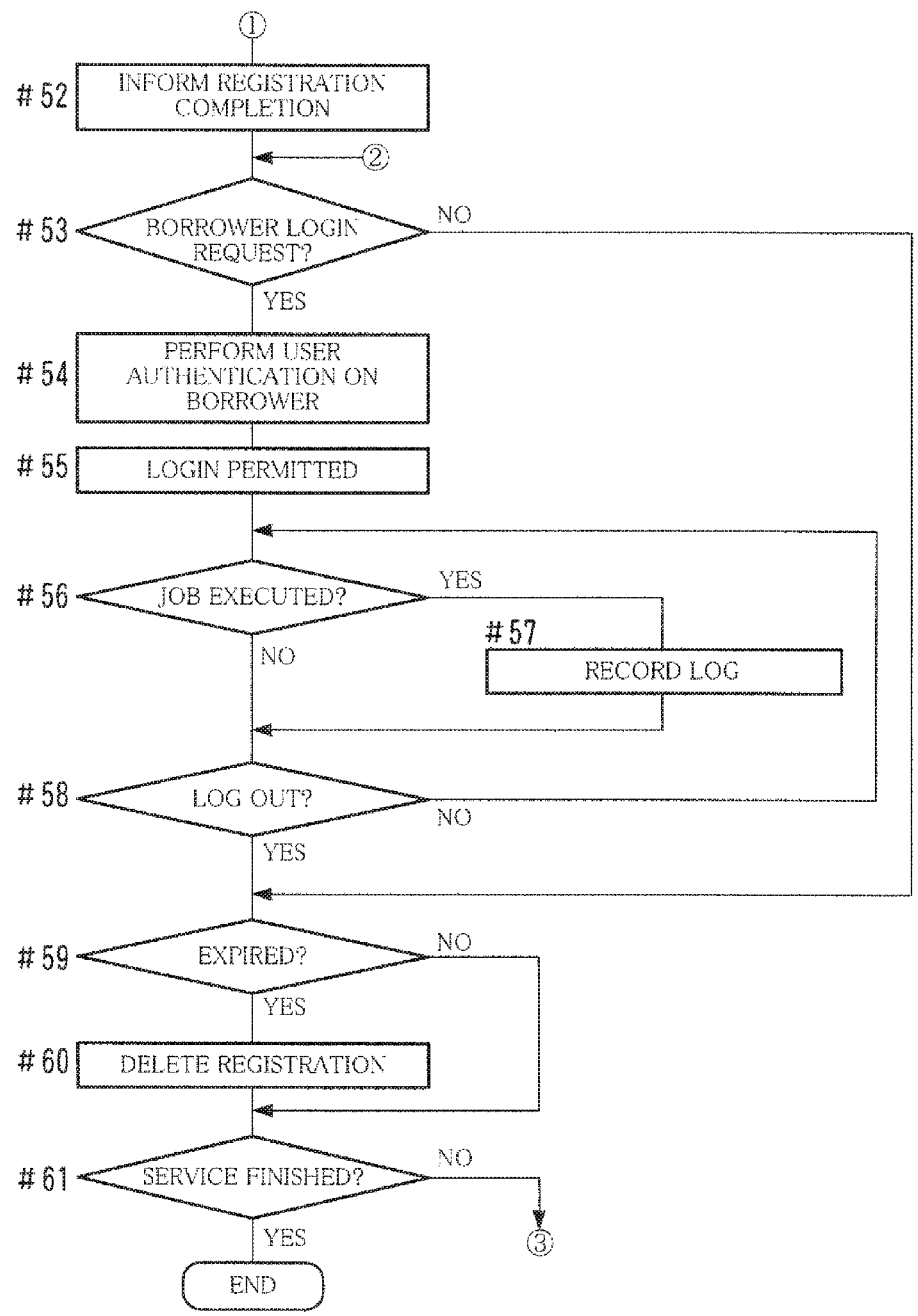
FIG. 14 is a flowchart depicting an example of the flow of the entire processing by an image forming apparatus.
Figure 15:
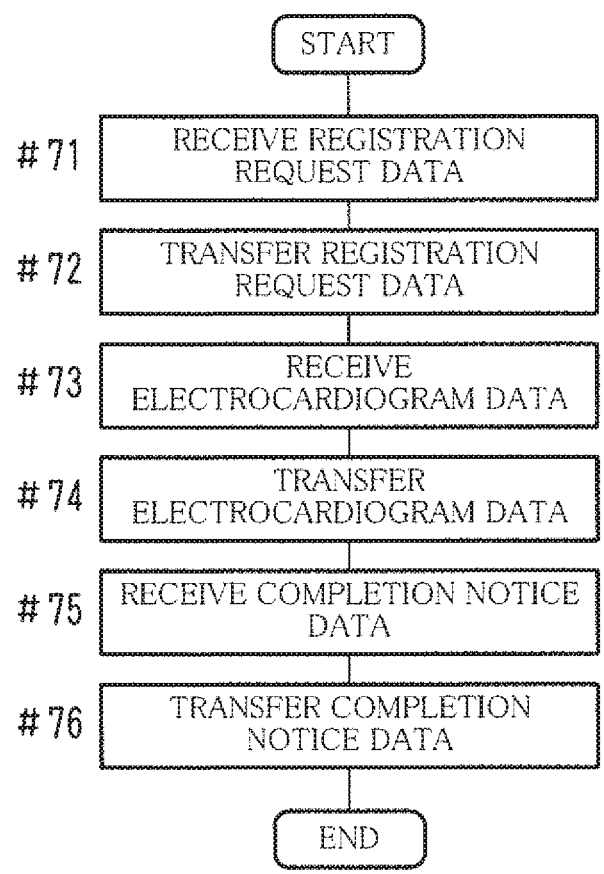
FIG. 15 is a flowchart depicting an example of the flow of the entire processing by a terminal.

FIGS. 11 and 12 are flowcharts depicting an example of the flow of the entire processing by the wearable computer 2. FIGS. 13 and 14 are flowcharts depicting an example of the flow of the entire processing by the image forming apparatus 1. FIG. 15 is a flowchart depicting an example of the flow of the entire processing by the terminal 3.

The description goes on to the flow of the entire processing by each of the image forming apparatus 1, the wearable computer 2, and the terminal 3. The description is provided with reference to the flowcharts.

The wearable computer 2 performs processing based on the authentication program 20P in the steps as shown in FIGS. 11 and 12.

The wearable computer 2 performs processing depending on the mode as discussed below every time the wearable computer 2 detects any one of the following: the wearable computer 2 being worn by a user; entry of a switch command; the wearable computer 2 approaching the image forming apparatus 1 or the terminal 3; and the wearable computer 2 being removed from the user.

The wearable computer 2 detects being worn by a user (YES in Step #11 of FIG. 11). At this time, the wearable computer 2 generates electrocardiogram data (electrocardiogram data 6D or electrocardiogram data 6H) by making a record of cardiac action potential or cardiac action current of the user (Step #12).

If the current mode is the normal mode (YES in Step #13), then the wearable computer 2 performs user authentication based on the electrocardiogram data 6D generated and the owner electrocardiogram data 6A stored in advance (Step #14).

After the user is successfully authenticated (YES in Step #15), the wearable computer 2 switches the current mode to the registration mode (Step #17) if the switch command is detected (YES in Step #16).

In contrast, if the current mode is not the normal mode (NO in Step #13), then the wearable computer 2 stores the electrocardiogram data 6H generated into the borrower electrocardiogram storage portion 214 (Step #18).

The wearable computer 2 detects approach thereof to the near field communication device 10i of the image forming apparatus 1 (YES in Step #19). If the current mode is the normal mode (YES in Step #20), then the wearable computer 2 sends the owner login request data 6E to the image forming apparatus 1 to request the same to allow the owner to log into the image forming apparatus 1 (Step #21).

If the current mode is the borrower registration mode (NO in Step #20, YES in Step #22 of FIG. 12), then the wearable computer 2 sends the registration request data 6G to the image forming apparatus 1 to request the same to register the borrower into the image forming apparatus 1 (Step #24), provided that the wearable computer 2 is worn by the owner (YES in Step #23). When receiving the completion notice data 6J from the image forming apparatus 1 (Step #25), the wearable computer 2 switches the current mode to the borrower service mode (Step #26).

If the wearable computer 2 is worn by the borrower (NO in Step #23), then the wearable computer 2 sends the electrocardiogram data 6H to the image forming apparatus 1 (Step #27).

If the current mode is the borrower service mode (NO in Step #20, NO in Step #22), then the wearable computer 2 sends the borrower login request data 6K to the image forming apparatus 1 to request the same to allow the borrower to log into the image forming apparatus 1 (Step #28).

The wearable computer 2 detects removal thereof from the user (YES in Step #29). If the current mode is the borrower service mode (YES in Step #30), then the wearable computer 2 deletes the electrocardiogram data 6H (Step #31) and switches the current mode to the normal mode (Step #32). In short, the state where the wearable computer 2 is lent is completed and the reset processing is performed.

The wearable computer 2 repeats the processing from Steps #11 through #32 appropriately until the wearable computer 2 is turned OFF.

In order for the owner of the wearable computer 2 to register a borrower through the terminal 3, the owner moves the wearable computer 2 closer to the terminal 3 for registration.

In such a case, therefore, the wearable computer 2 sends/receives data, as discussed above, with the terminal 3 rather than the image forming apparatus 1.

The image forming apparatus 1 performs processing based on the usage management program 10P in the steps as shown in FIGS. 13 and 14.

Every time receiving data from the wearable computer 2, or, alternatively, at predetermined time intervals, the image forming apparatus 1 performs processing as follows.

When receiving the owner login request data 6E (YES in Step #41 of FIG. 13), the image forming apparatus 1 performs user authentication (Step #42). If the user is successfully authenticated, then the image forming apparatus 1 allows the user to log thereinto as the owner of the wearable computer 2 (Step #43).

While the user logs in (NO in Step #46), the image forming apparatus 1 executes a job in accordance with a command given by the user (YES in Step #44), and generates log data 6F to store the same into the log data storage portion 104 (Step #45).

When receiving the registration request data 6G (YES in Step #47), the image forming apparatus 1 performs user authentication on the owner of the wearable computer 2 (Step #48). If the user is successfully authenticated, then the image forming apparatus 1 waits for the wearable computer 2 to send the electrocardiogram data 6H for a predetermined amount of time (Step #49).

When receiving the electrocardiogram data 6H before the elapse of the predetermined amount of time (YES in Step #50), the image forming apparatus 1 stores the electrocardiogram data 6H into the electrocardiogram data storage portion 106 (Step #51), and sends the completion notice data 6J to the wearable computer 2 (Step #52 of FIG. 14).

When receiving the borrower login request data 6K (YES in Step #53), the image forming apparatus 1 performs user authentication (Step #54). If the user is successfully authenticated, then the image forming apparatus 1 allows the user to log thereinto as the borrower of the wearable computer 2 (Step #55).

While the user logs in (NO in Step #58), the image forming apparatus 1 executes a job in accordance with a command given by the user (YES in Step #56), and generates log data 6L to store the same into the log data storage portion 104 (Step #57).

If the predetermined amount of time has elapsed since the electrocardiogram data 6H was stored (YES in Step #59), then the image forming apparatus 1 deletes the electrocardiogram data 6H from the electrocardiogram data storage portion 106 (Step #60).

When the owner of the wearable computer 2 logs into the image forming apparatus 1 in Step #43, it is possible to delete the electrocardiogram data 6H indicating the user code of the owner, namely, electrocardiogram data of the borrower of the wearable computer 2.

The image forming apparatus 1 performs the processing of Steps #41 through #60 appropriately before terminating the borrowed band login service.

When registration of the borrower is performed through the terminal 3, the image forming apparatus 1 receives the registration request data 6G and the electrocardiogram data 6H from the terminal 3, and sends the completion notice data 6J to the terminal 3.

) The terminal 3 performs processing based on the registration assistance program 30P in the steps as depicted in FIG. 15.

The terminal 3 receives the registration request data 6G from the wearable computer 2 (Step #71 of FIG. 15), and transfers the registration request data 6G to the image forming apparatus 1 (Step #72).

Thereafter, when receiving the electrocardiogram data 6H from the wearable computer 2 (Step #73), the terminal 3 transfers the electrocardiogram data 6H to the image forming apparatus 1 (Step #74).

When receiving the completion notice data 6J from the image forming apparatus 1 (Step #75), the terminal 3 transfers the completion notice data 6J to the wearable computer 2 (Step #76).

According to the first embodiment, when the wearable computer 2 of a user (user 8A, for example) is used by another user (user 8B, for example), after the user 8A is successfully authenticated by each of the image forming apparatus 1 and the wearable computer 2, the wearable computer 2 is worn by the user 8B, an electrocardiogram is obtained from the user 8B, and data thereof (electrocardiogram data 6H) is registered into the image forming apparatus 1.

Every time the user 8B attempts to log into the image forming apparatus 1, the wearable computer 2 sends electrocardiogram data (borrower login request data 6K) for the user 8B to the image forming apparatus 1. The image forming apparatus 1 verifies the authenticity of the user 8B based on the registered electrocardiogram data 6H and the received borrower login request data 6K.

As described above, electrocardiogram data for the borrower is registered into the image forming apparatus 1 by permission of the owner of the wearable computer 2. This improves the environment for user authentication.

Thus, according to the first embodiment, it is possible to make it easy, as compared to conventional technologies, for a user to wear the wearable computer 2 of another user to log into the image forming apparatus 1 with a certain level of security maintained.

Further, even when the borrower does not have a user code, he/she can wear the wearable computer 2 to log into the image forming apparatus 1.

Second Embodiment

Figure 16:
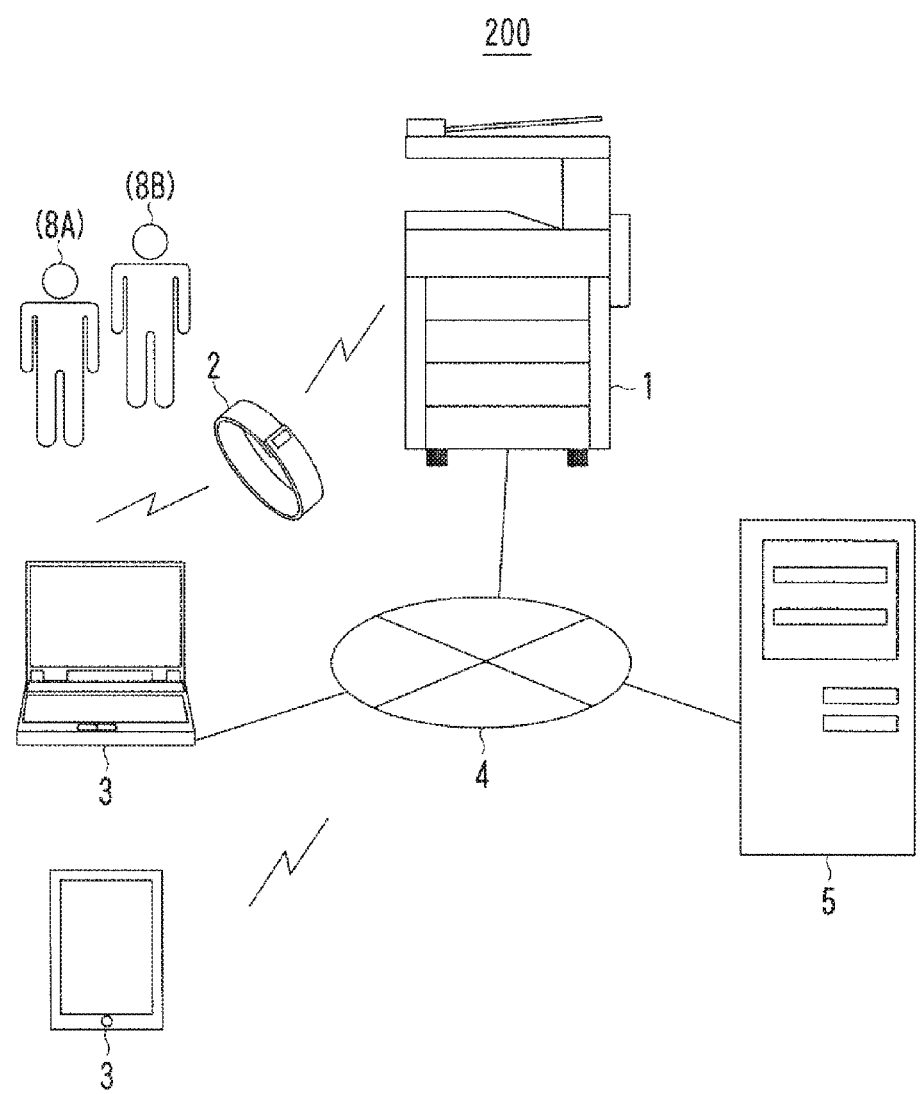
FIG. 16 is a diagram showing an example of the overall configuration of an image processing system.
Figure 17:
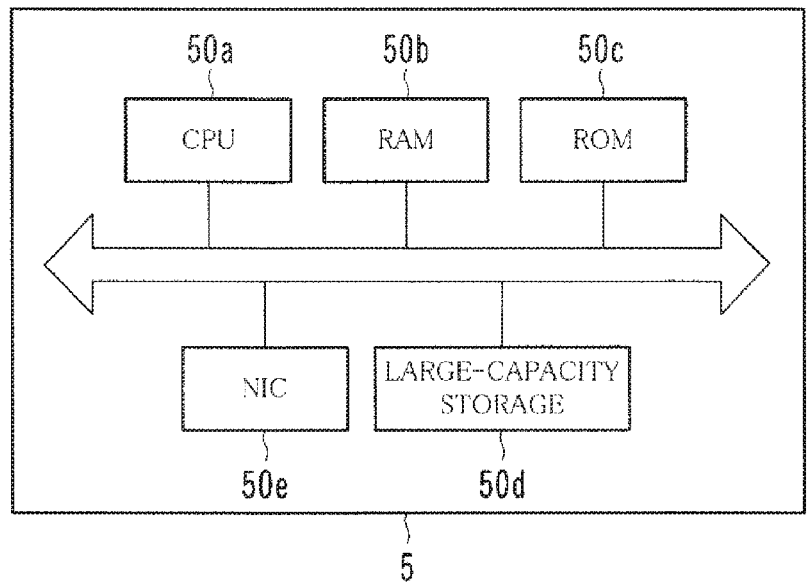
FIG. 17 is a diagram showing an example of the hardware configuration of an authentication server.
Figure 18:
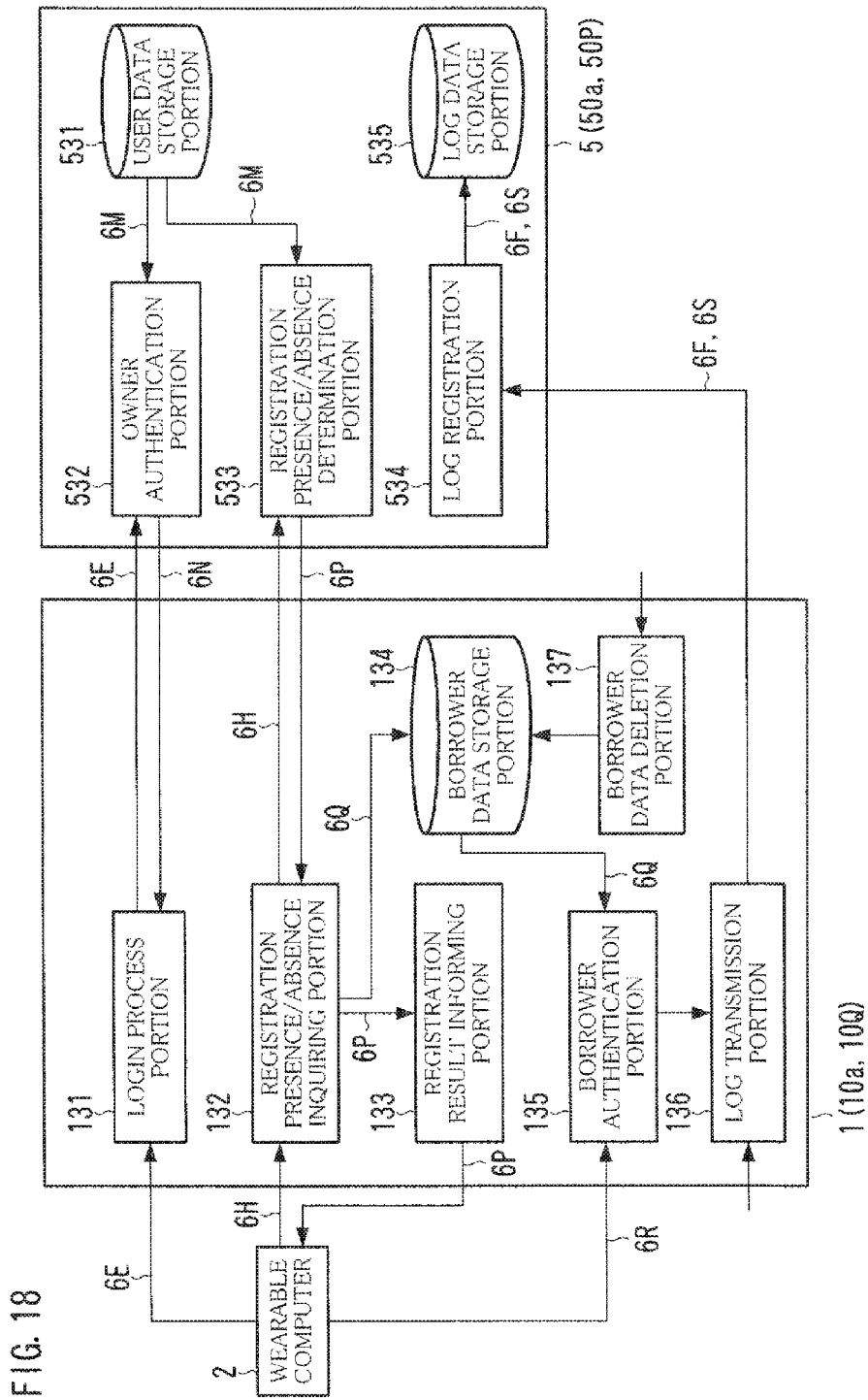
FIG. 18 is a diagram showing an example of the functional configuration of an image forming apparatus and the functional configuration of an authentication server.
Figure 19:
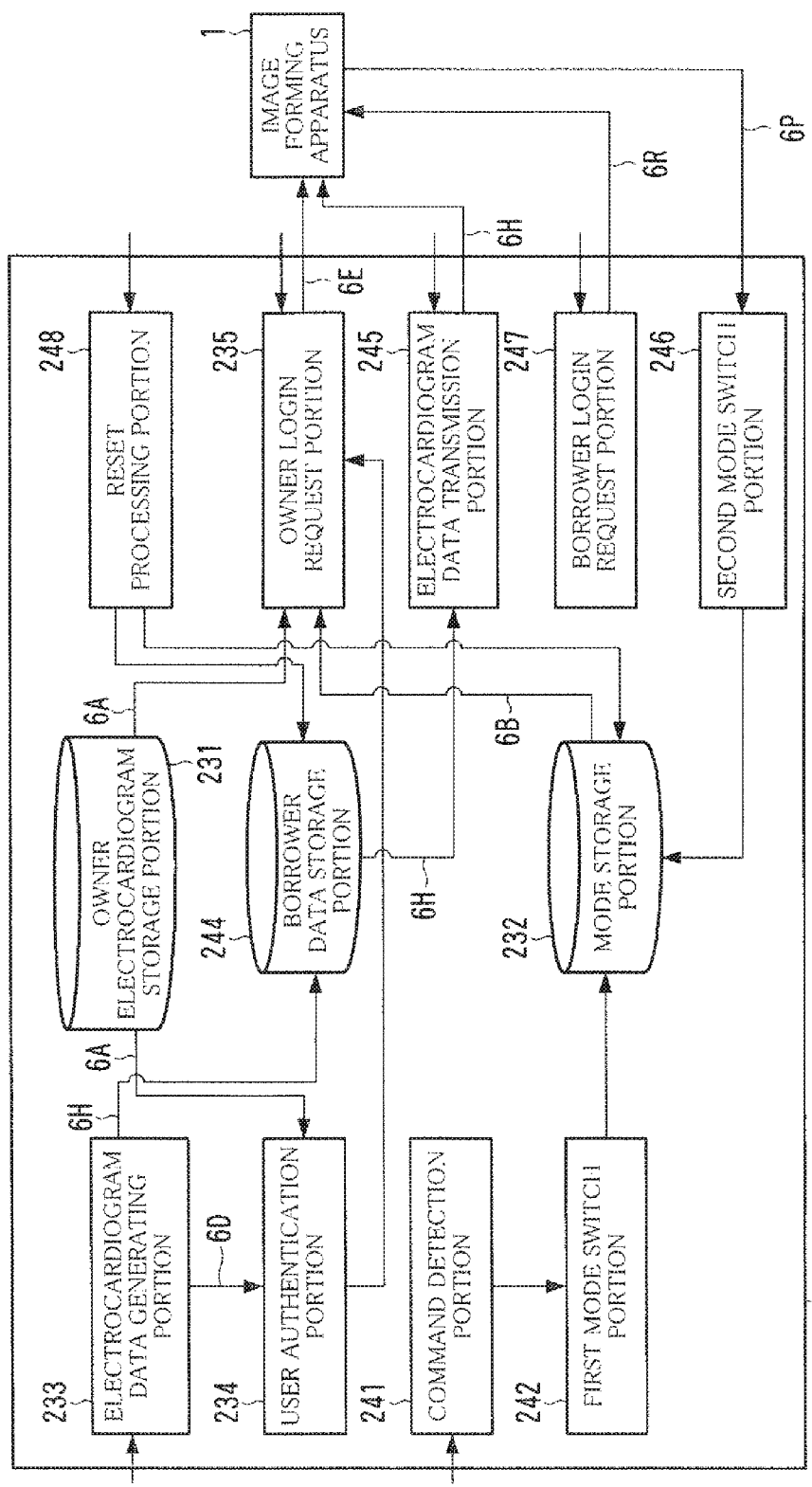
FIG. 19 is a diagram showing an example of the functional configuration of a wearable computer.

FIG. 16 is a diagram showing an example of the overall configuration of an image processing system 200. FIG. 17 is a diagram showing an example of the hardware configuration of an authentication server 5. FIG. 18 is a diagram showing an example of the functional configuration of the image forming apparatus 1 and the functional configuration of the authentication server 5. FIG. 19 is a diagram showing an example of the functional configuration of the wearable computer 2.

In the first embodiment, the image forming apparatus 1 performs user authentication for allowing a user to log into the subject image forming apparatus 1. In the second embodiment, a server performs such user authentication.

Referring to FIG. 16, the image processing system 200 is configured of the image forming apparatus 1, the wearable computer 2, the terminal 3, the authentication server 5, the communication line 4, and so on.

As with the image processing system 100, the image processing system 200 is used by members of an organization such as a company, a government office, or a school. Each of the members (users) is given a unique user code.

The image forming apparatus 1, the terminal 3, and the authentication server 5 are configured to perform communication with one another via the communication line 4.

The hardware configuration of the image forming apparatus 1 is the same as that in the first embodiment, which is shown in FIG. 2. It is noted, however, that the ROM 10c or the auxiliary storage 10d stores therein a usage management program 10Q (FIG. 18) instead of the usage management program 10P.

The hardware configuration of the wearable computer 2 is the same as that in the first embodiment, which is shown in FIG. 3. It is noted, however, that the ROM 20c or the flash memory 20d stores an authentication program 20Q (FIG. 19) therein.

Referring to FIG. 17, the authentication server 5 is configured of a CPU 50a, a RAM 50b, a ROM 50c, a large-capacity storage 50d, an NIC 50e, and so on.

The NIC 50e performs communication with the image forming apparatus 1 or the like in accordance with a protocol such as TCP/IP.

The ROM 50c or the large-capacity storage 50d stores an authentication program 50Q (FIG. 18) therein. The authentication program 50Q is to perform processing for user authentication on a user who attempts to log into the image forming apparatus 1.

The authentication program 50Q is loaded into the RAM 50b and is executed by the CPU 50a. The large-capacity storage 50d is, for example, a hard disk drive or an SSD.

The usage management program 100 implements, in the image forming apparatus 1, the functions of a login process portion 131, a registration presence/absence inquiring portion 132, a registration result informing portion 133, a borrower data storage portion 134, a borrower authentication portion 135, a log transmission portion 136, a borrower data deletion portion 137, and so on, all of which are shown in FIG. 18.

The authentication program 50Q implements, in the authentication server 5, the functions of a user data storage portion 531, an owner authentication portion 532, a registration presence/absence determination portion 533, a log registration portion 534, a log data storage portion 535, and so on, all of which are shown in FIG. 18.

The authentication program 20Q implements, in the wearable computer 2, the functions of an owner electrocardiogram storage portion 231, a mode storage portion 232, an electrocardiogram data generating portion 233, a user authentication portion 234, an owner login request portion 235, a command detection portion 241, a first mode switch portion 242, a borrower data storage portion 244, an electrocardiogram data transmission portion 245, a second mode switch portion 246, a borrower login request portion 247, a reset processing portion 248, and so on, all of which are shown in FIG. 19.

The description goes on to the functions of the individual portions shown in FIGS. 18 and 19. Description of points common to those in the first embodiment shall be omitted.

As with the first embodiment, the wearable computer 2 has the normal mode, the borrower registration mode, and the borrower service mode.

With the wearable computer 2, the owner electrocardiogram storage portion 231 stores, in advance, owner electrocardiogram data 6A, similarly to the case of the owner electrocardiogram storage portion 201 (FIG. 5) of the first embodiment.

As with the mode storage portion 202 of the first embodiment, the mode storage portion 232 stores the mode data 6B in advance. The initial value of the mode data 6B is the normal mode as with the first embodiment.

With the authentication server 5, the user data storage portion 531 stores, in advance, electrocardiogram data 6M indicating a user code and an electrocardiogram of each user.

[Processing for the Case where the Owner Uses the Wearable Computer 2]

Figure 20:
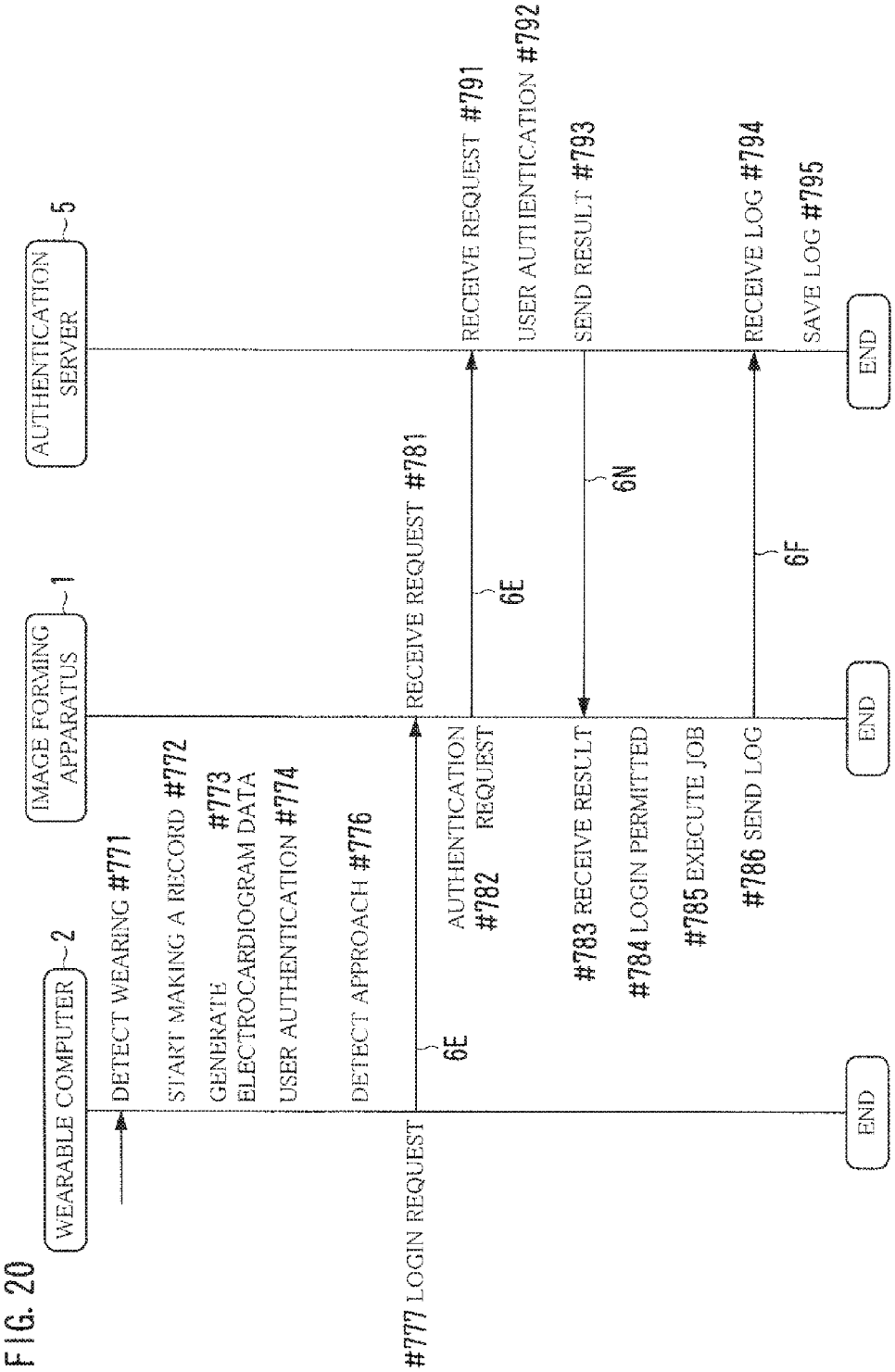
FIG. 20 is a sequence diagram depicting an example of the flow of processing performed by each device for the case where an owner uses a wearable computer.

FIG. 20 is a sequence diagram depicting an example of the flow of processing performed by each device for the case where the owner uses the wearable computer 2.

Where the owner uses the wearable computer 2, the individual portions of the image forming apparatus 1, the individual portions of the wearable computer 2, and the individual portions of the authentication server 5 perform processing in the steps as shown in FIG. 20. The processing is detailed below by taking an example in which the user 8A uses his/her wearable computer 2.

The user 8A wears the wearable computer 2 around his/her wrist. When it is detected that the subject wearable computer 2 is worn (Step #771 of FIG. 20), the biometric information sensor 20e starts recording the cardiac action potential or the cardiac action current (Step #772).

Where the normal mode is indicated in the mode data 6B, the electrocardiogram data generating portion 233 generates (Step #773) electrocardiogram data 6D for the person who wears the wearable computer 2, i.e., the user 8A, in the same manner as that by the electrocardiogram data generating portion 203 of the first embodiment.

Where the normal mode is indicated in the mode data 6B, the user authentication portion 234 performs user authentication on the user 8A based on the owner electrocardiogram data 6A and the electrocardiogram data 6D (Step #774) as with the user authentication portion 204.

If the user 8A is successfully authenticated, then the user 8A moves to the installation site of the image forming apparatus 1 without removing the wearable computer 2 from him/her as with the first embodiment. The user then moves the wearable computer 2 closer to the near field communication device 10i of the image forming apparatus 1.

The near field communication device 20f detects approach of the wearable computer 2 to the near field communication device 10i (Step #776). At this time, if the mode data 6B indicates the normal mode, and further, if the wearable computer 2 is still worn by the user 8A even after the successful user authentication, then the owner login request portion 235 sends the owner login request data 6E to the image forming apparatus 1 by means of the near field communication device 20f (Step #777).

With the image forming apparatus 1, when the near field communication device 10i receives the owner login request data 6E (Step #781), the login process portion 131 performs processing for allowing the user 8A to log into the image forming apparatus 1 in the following manner.

The login process portion 131 transfers the owner login request data 6E to the authentication server 5 by using the NIC 10g (Step #782). Thereby, a request for determination whether or not the owner of the wearable computer 2 is allowed to log into the image forming apparatus 1 is made to the authentication server 5.

With the authentication server 5, the owner authentication portion 532 receives the owner login request data 6E (Step #791), and performs user authentication as follows (Step #792).

The owner authentication portion 532 determines whether or not the user code indicated in the owner login request data 6E is shown in any of pieces of the electrocardiogram data 6M stored in the user data storage portion 531. If the determination is positive, then the owner authentication portion 532 determines that the user corresponding to the user code is an authorized user. If none of pieces of the electrocardiogram data 6M shows the user code, then the owner authentication portion 532 determines that the user corresponding to the user code is not an authorized user.

When the user is successfully authenticated, the owner authentication portion 532 sends authentication result data 6N indicating the fact to the image forming apparatus 1 (Step #793).

With the image forming apparatus 1, the login process portion 131 receives the authentication result data 6N (Step

783), and allows the user 8A to log into the image forming apparatus 1 as the owner of the wearable computer 2 (Step #784).

This enables the user 8A to instruct the image forming apparatus 1 to execute a variety of jobs until the user 8A logs out of the image forming apparatus 1.

As with the first embodiment, the individual portions of the image forming apparatus 1 execute a job based on a command given by the user 8A (Step #785).

In response, the log transmission portion 136 generates log data 6F in the same manner as that by the log registration portion 103 of the first embodiment (Step #786). The log transmission portion 136 then sends the log data 6F to the authentication server 5 (Step #787).

With the authentication server 5, the log registration portion 534 receives the log data 6F (Step #794), and stores the same into the log data storage portion 535 (Step #795).

When the user authentication fails in Step #792, the user BA is not permitted to log into the image forming apparatus 1. Therefore, the user 8A cannot instruct the image forming apparatus 1 to execute a job.

[Processing for the Case where a Borrower Uses the Wearable Computer 2]

Figure 21:
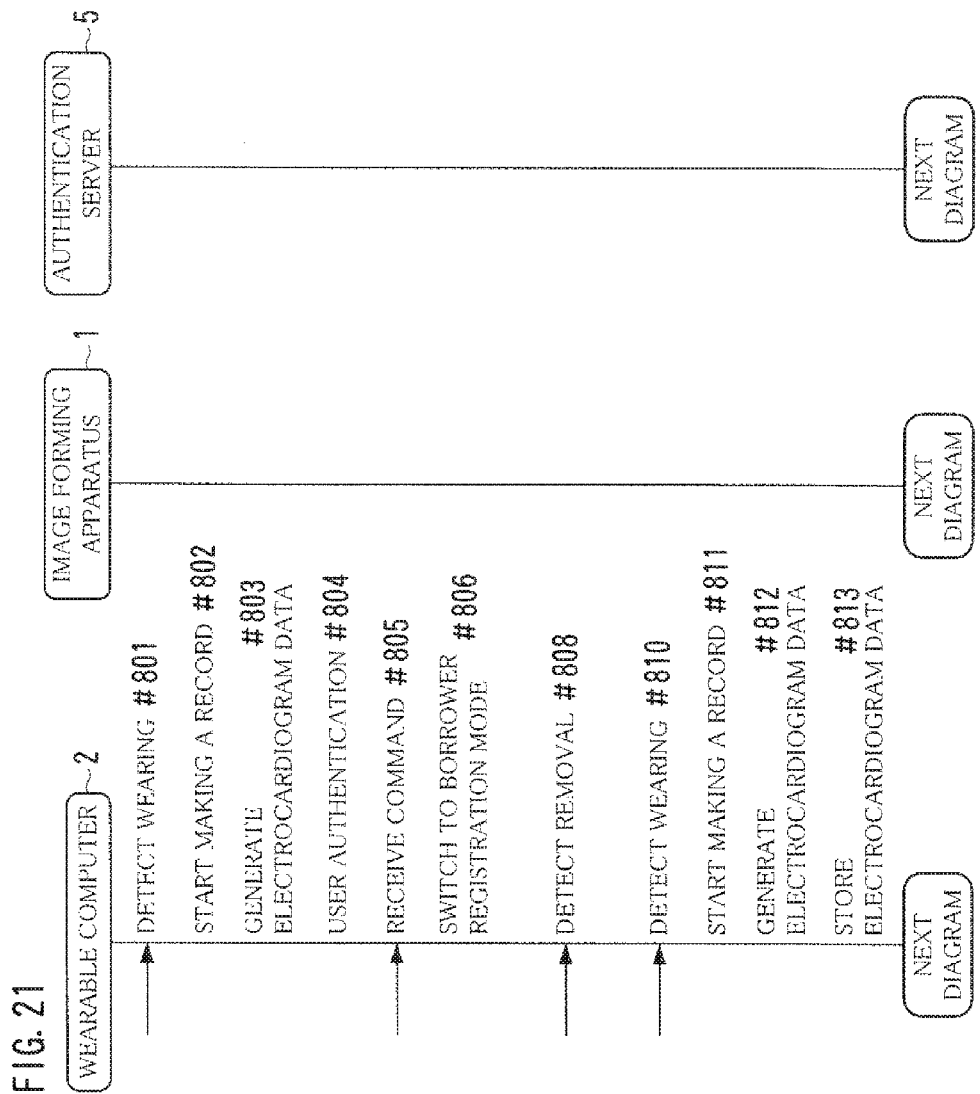
FIG. 21 is a sequence diagram depicting an example of the flow of processing performed by each device for the case where a borrower uses a wearable computer.
Figure 22:
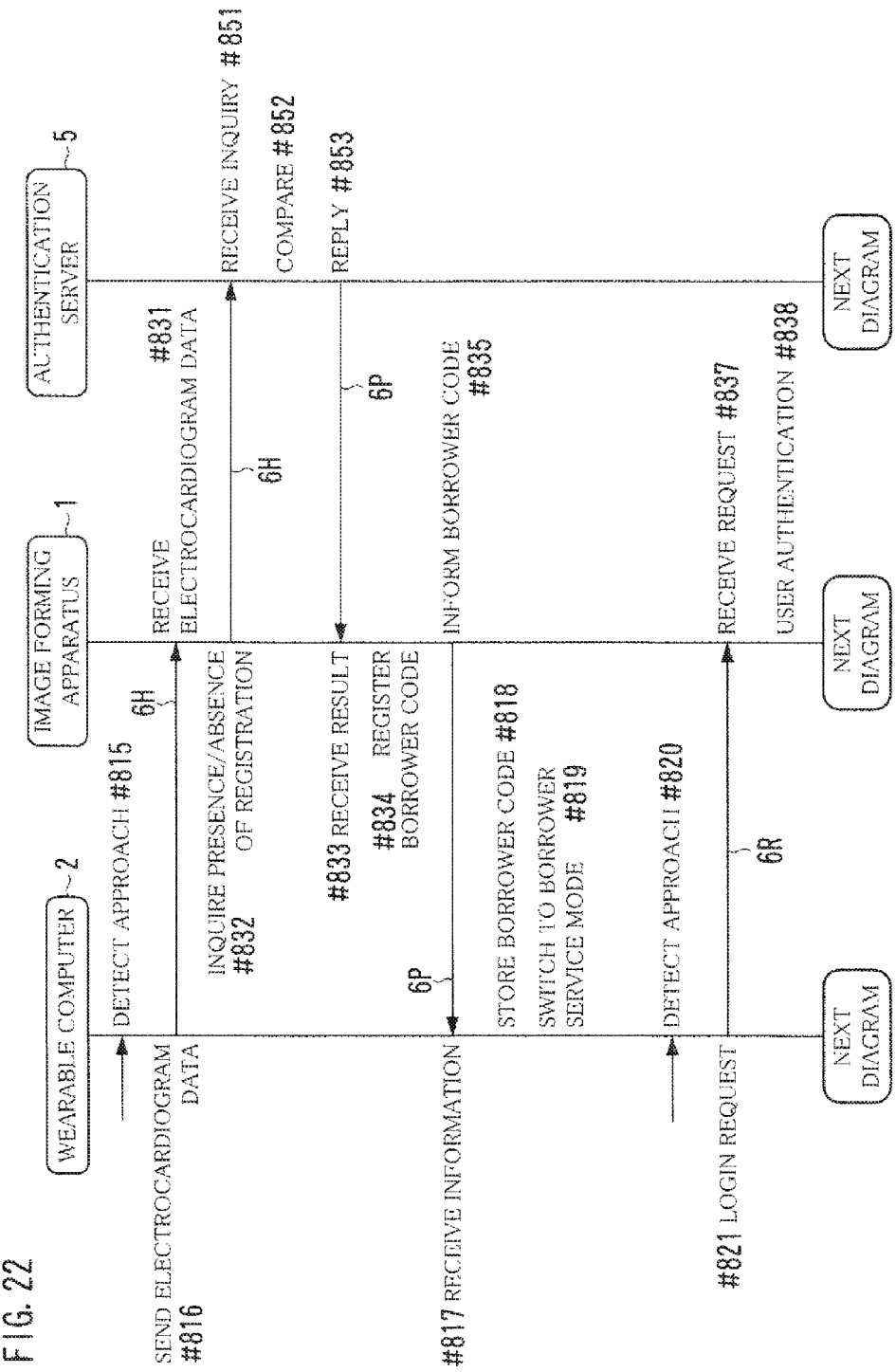
FIG. 22 is a sequence diagram depicting an example of the flow of processing performed by each device for the case where a borrower uses a wearable computer.
Figure 23:
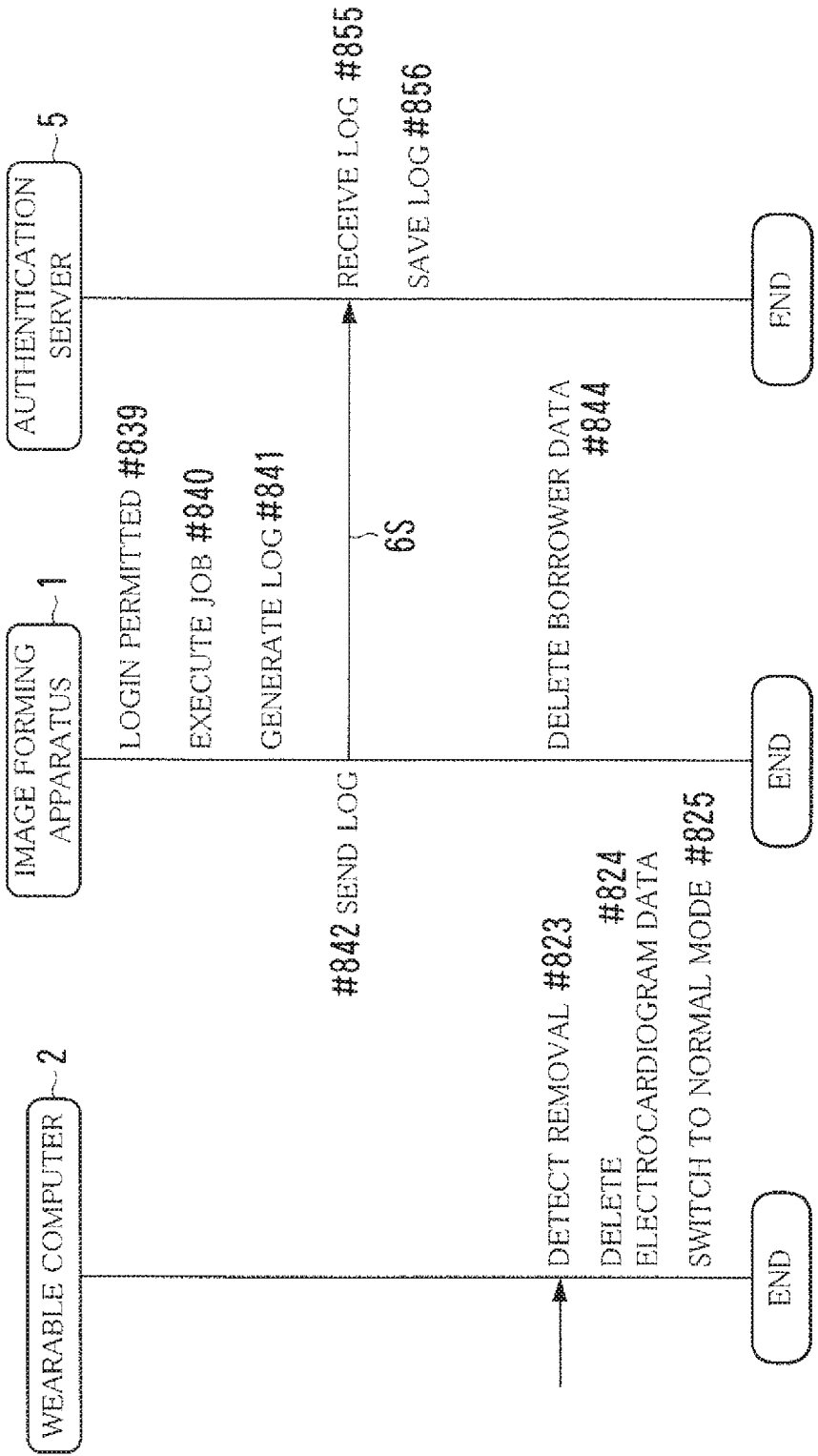
FIG. 23 is a sequence diagram depicting an example of the flow of processing performed by each device for the case where a borrower uses a wearable computer.

FIGS. 21 through 23 are sequence diagrams depicting an example of the flow of processing performed by each device for the case where a borrower uses the wearable computer 2.

As with the first embodiment, a user borrows the wearable computer 2 from another user. The user can use the wearable computer 2 to log into the image forming apparatus 1 to cause the image forming apparatus 1 to execute a job. The mechanism thereof is described below by taking an example in which the user 8A lends his/her wearable computer 2 to the user 8B.

The individual portions of the image forming apparatus 1, the individual portions of the wearable computer 2, and the individual portions of the authentication server 5 perform processing in the steps as depicted in FIGS. 21 through 23.

(1) Preparation

When the user 8A wears the wearable computer 2, the biometric information sensor 20e, the electrocardiogram data generating portion 233, and the user authentication portion 234 respectively senses that the wearable computer 2 is worn, generates the electrocardiogram data 6D, and performs user authentication (Steps #801 through #804 of FIG. 21) in a manner similar to that in Steps #701 through #704 of FIG. 7 and in Steps #721 through #724 of FIG. 9.

In order for the user 8A to lend the wearable computer 2 to the user 8B, the user 8A performs operation for switching to the borrower registration mode as with the first embodiment.

In response to the operation by the user 8A, the command detection portion 241 detects a switch command as with the command detection portion 211 (Step #805).

When the switch command is detected, the first mode switch portion 242 updates the mode data 6B stored in the mode storage portion 202 so as to indicate the borrower registration mode (Step #806), as with the first mode switch portion 212 of the first embodiment. Thereby, the mode is switched to the borrower registration mode.

The user 8A removes the wearable computer 2 from him/her and lends the same to the user 8B. In response, the biometric information sensor 20e of the wearable computer 2 detects the removal of the subject wearable computer 2 from the user 8A (Step #808).

The user 8B wears the wearable computer 2 around his/her wrist. In response, as with the case of the first embodiment, the biometric information sensor 20e makes a record of the cardiac action potential or the cardiac action current of the user 8B, and the electrocardiogram data generating portion 233 generates electrocardiogram data 6H (Steps #810 through #812).

If the mode data 6B indicates the borrower registration mode, then the electrocardiogram data 6H is stored into the borrower data storage portion 244 (Step #813).

The user 8B moves the wearable computer 2 closer to the near field communication device 10i of the image forming apparatus 1.

The near field communication device 20f detects the approach of the wearable computer 2 to the near field communication device 10i (Step #815 of FIG. 22). At this time, the electrocardiogram data transmission portion 245 sends the electrocardiogram data 6H to the image forming apparatus 1, as with the electrocardiogram data transmission portion 215 of the first embodiment (Step #816).

With the image forming apparatus 1, when receiving the electrocardiogram data 6H (Step #831), the registration presence/absence inquiring portion 132 inquires of the authentication server 5 whether or not the borrower is a user of the image processing system 200 (Step #832). At this time, the registration presence/absence inquiring portion 132 transfers the electrocardiogram data 6H to the authentication server 5.

With the authentication server 5, when receiving the electrocardiogram data 6H (Step #851), the registration presence/absence determination portion 533 determines whether or not the user data storage portion 531 stores the electrocardiogram data 6M for the user 8B by using a known method to compare an electrocardiogram shown in the electrocardiogram data 6H (namely, electrocardiogram for the user 8B) and an electrocardiogram shown in each piece of the electrocardiogram data 6M stored in the user data storage portion 531 (Step #852). In short, the registration presence/absence determination portion 533 determines whether or not the electrocardiogram for the user BE is registered.

If the user data storage portion 531 stores the electrocardiogram data 6M for the user 8B, then the registration presence/absence determination portion 533 sends borrower code data 6P to the image forming apparatus 1 (Step #853). The borrower code data 6P shows that the user 8B is registered and a user code indicted in the electrocardiogram data 6M.

When the registration presence/absence inquiring portion 132 of the image forming apparatus 1 receives the borrower code data 6P (Step #833), borrower data 6Q is generated and stored into the borrower data storage portion 134 (Step #834). The borrower data 6Q indicates, as a borrower code, a user code of the borrower of the wearable computer 2, i.e., a user code of the user 8B. The borrower data 6Q also indicates, as a lender code, a user code of the lender of the wearable computer 2, i.e., a user code of the user 8A. The borrower code is the same as the user code indicated in the borrower code data 6P. The lender code is the same as the user code indicated in the electrocardiogram data 6H received in Step #831.

The registration result informing portion 133 sends the borrower code data 6P to the wearable computer 2 (Step #835). Thereby, information on the presence/absence of registration of the borrower is sent to the wearable computer 2.

With the wearable computer 2, the second mode switch portion 246 receives the borrower code data 6P (Step #817) and stores the borrower code data 6P into the borrower data storage portion 244 (Step #818). The second mode switch portion 246 also updates the mode data 6B stored in the mode storage portion 232 so that the borrower service mode is indicated therein (Step #819). This switches the mode to the borrower service mode.

By the processing described above, preparation for the user 8B to log into the image forming apparatus 1 is completed.

(2) Use of the Image Forming Apparatus 1

As with the first embodiment, after the mode of the wearable computer 2 is switched to the borrower service mode, the user 8B moves the wearable computer 2 away from the image forming apparatus 1, and then, moves again the wearable computer 2 closer to the image forming apparatus 1.

The near field communication device 20f detects the approach of the wearable computer 2 to the near field communication device 10i (Step #820). At this time, if the mode data 6B indicates the borrower service mode, the borrower login request portion 247 sends borrower login request data 6R to the image forming apparatus 1 by means of the near field communication device 20f (Step #821).

The borrower login request data 6R indicates the user code shown in the borrower code data 6P stored in the borrower data storage portion 244, namely, the user code of the user 8B.

With the image forming apparatus 1, when the near field communication device 10i receives the borrower login request data 6R (Step #837), the borrower authentication portion 135 performs user authentication in the following manner (Step #838).

The borrower authentication portion 135 matches the user code indicated in the borrower login request data 6R against the borrower code indicated in the borrower data 6Q stored in the borrower data storage portion 134. If there is a match therebetween, then the borrower authentication portion 135 determines that the user 8B is an authorized user. If the user is successfully authenticated, that is to say, if the user 8B is determined to be an authorized user, then the user 8B is permitted to log into the image forming apparatus 1 as the borrower of the wearable computer 2 (Step #839 of FIG. 23).

This enables the user 8B to instruct the image forming apparatus 1 to execute a variety of jobs until the user 8B logs out of the image forming apparatus 1.

The individual portions of the image forming apparatus 1 execute a job based on a command given by the user 8B (Step #840).

Where the borrower logs in the image forming apparatus 1, the log transmission portion 136 generates log data 6S (Step #841) to send the same to the authentication server 5 (Step #842). The log data 6S indicates the content of the job and the lender code shown in the borrower data 6Q, namely, the user code of the user 8A.

With the authentication server 5, the log registration portion 534 receives the log data 6S from the image forming apparatus 1 (Step #855) and stores the same into the log data storage portion 535 (Step #856).

(3) Reset

As with the first embodiment, when the user 8B does not need to use the image forming apparatus 1 anymore, he/she removes the wearable computer 2 from his/her wrist.

With the wearable computer 2, the biometric information sensor 20e detects the removal of the subject wearable computer 2 from the user 8B (Step #823). When the mode data 6B indicates the borrower service mode, the reset processing portion 248 performs reset processing in the following manner.

The reset processing portion 248 deletes the electrocardiogram data 6H and the borrower code data 6P from the borrower data storage portion 244 (Step #824). The reset processing portion 248 then updates the mode data 6B so as to show the normal mode (Step #825).

With the image forming apparatus 1, the borrower data deletion portion 137 deletes the borrower data 6Q from the borrower data storage portion 134 at a predetermined time (Step #844). For example, when the owner of the wearable computer 2 logs into the image forming apparatus 1 next time, the borrower data deletion portion 137 deletes the borrower data 6Q indicating the user code of the owner as the lender code. Alternatively, when a predetermined amount of time has elapsed since the borrower data 6Q was stored in the borrower data storage portion 134, the borrower data deletion portion 137 deletes the borrower data 6Q from the borrower data storage portion 134. The predetermined amount of time may be determined by the owner of the wearable computer 2, or, may be preset in the image forming apparatus 1.

Figure 24:
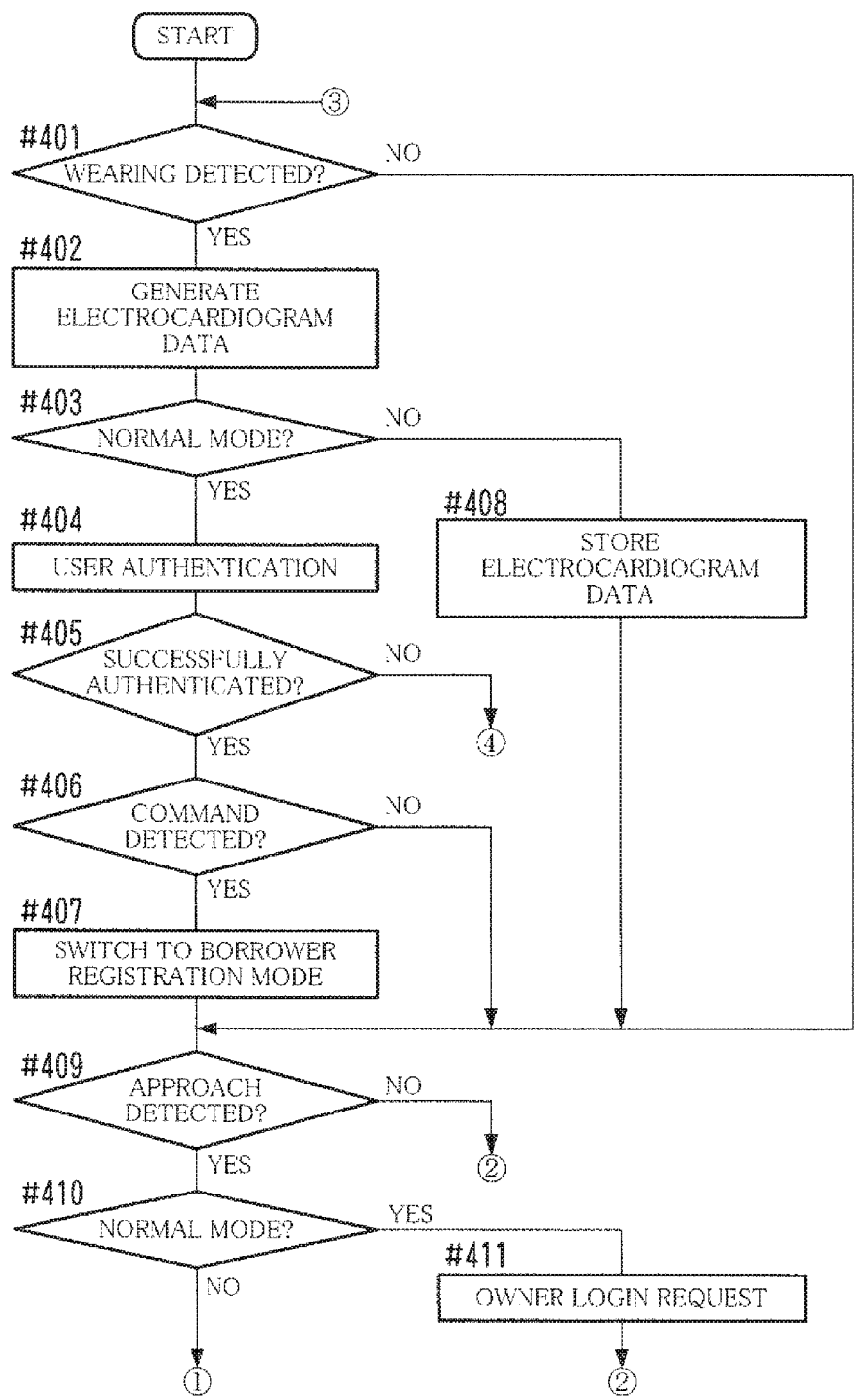
FIG. 24 is a flowchart depicting an example of the flow of the entire processing by a wearable computer.
Figure 25:
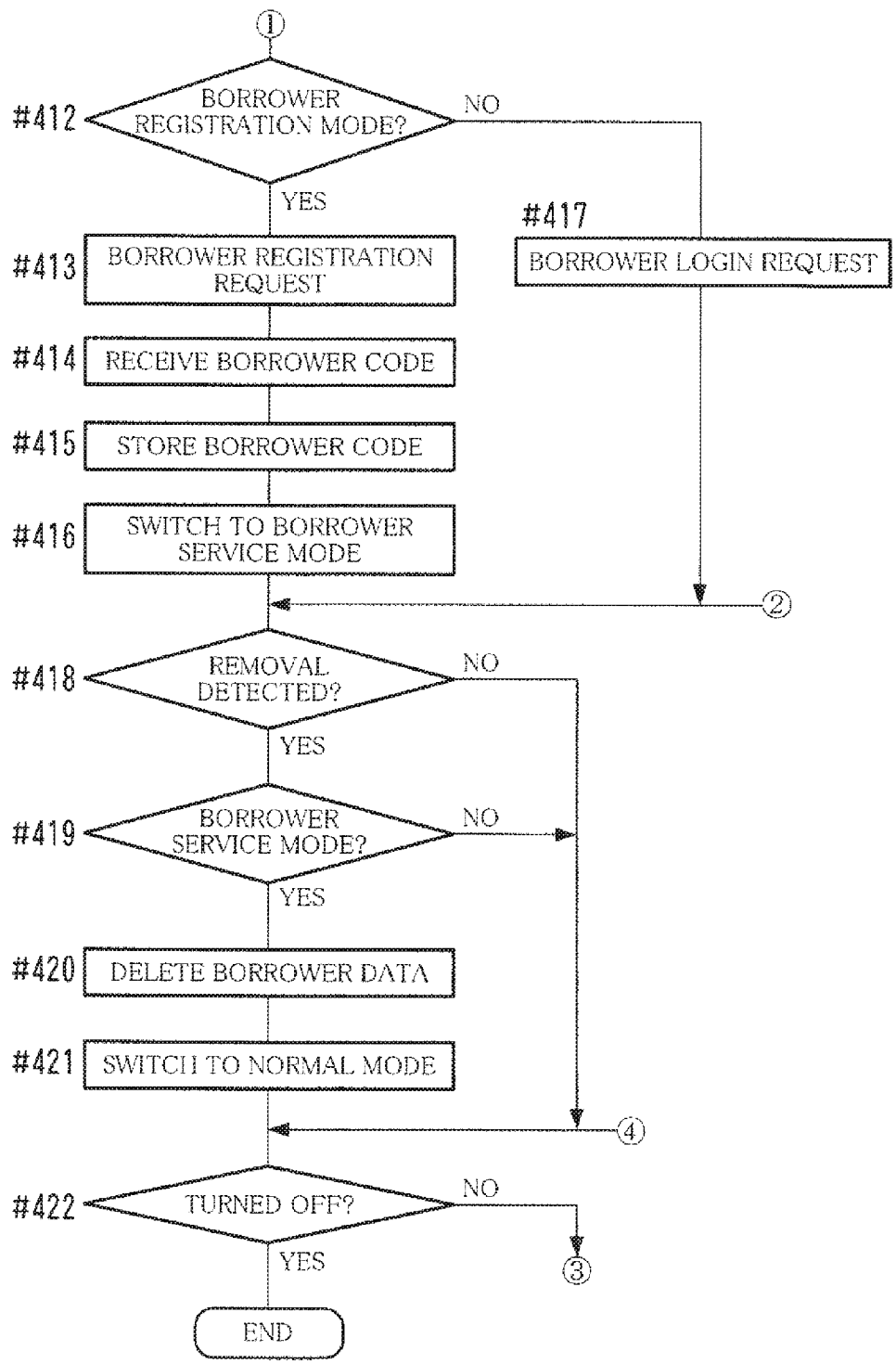
FIG. 25 is a flowchart depicting an example of the flow of the entire processing by a wearable computer.
Figure 26:
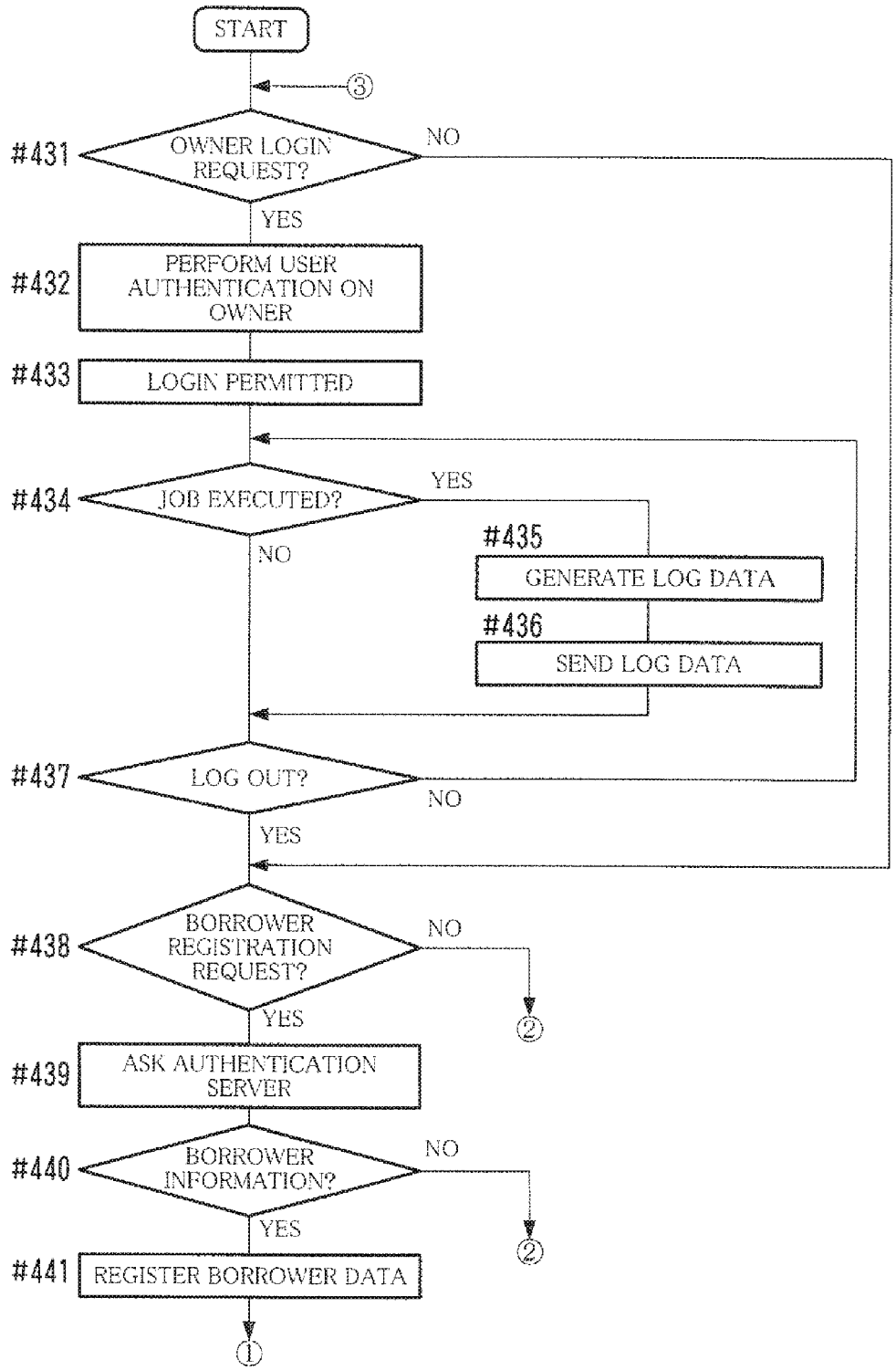
FIG. 26 is a flowchart depicting an example of the flow of the entire processing by an image forming apparatus.
Figure 27:
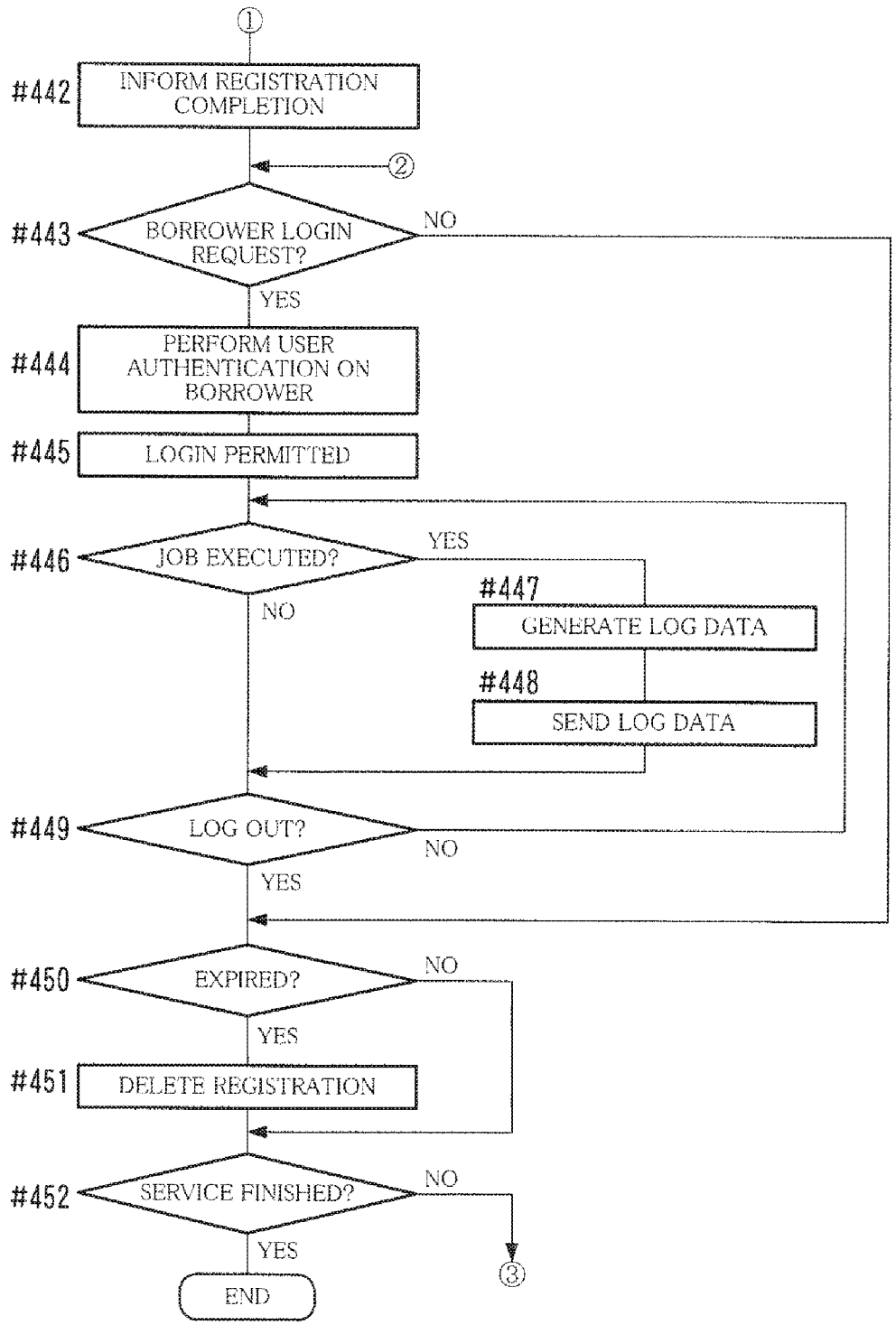
FIG. 27 is a flowchart depicting an example of the flow of the entire processing by an image forming apparatus.
Figure 28:
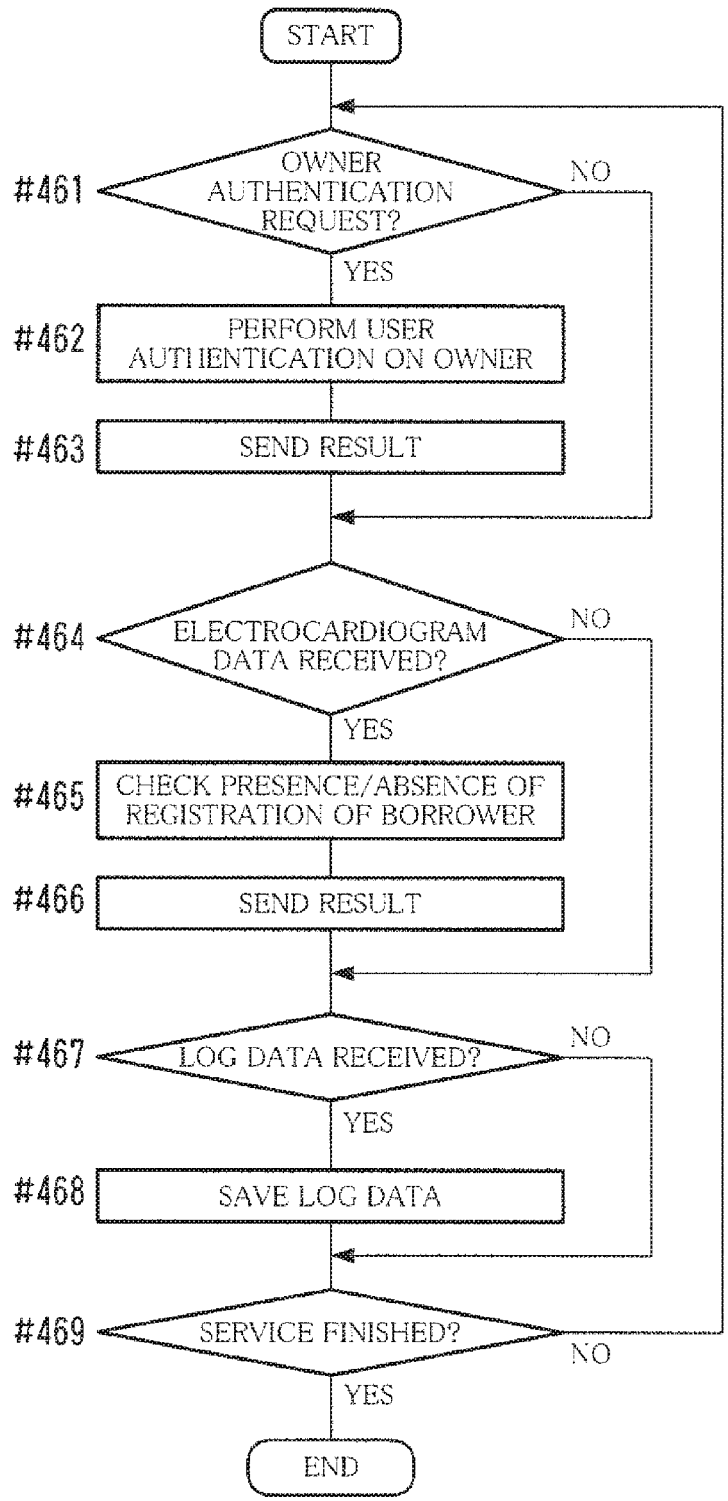
FIG. 28 is a flowchart depicting an example of the flow of the entire processing by an authentication server.

FIGS. 24 and 25 are flowcharts depicting an example of the flow of the entire processing by the wearable computer 2. FIGS. 26 and 27 are flowcharts depicting an example of the flow of the entire processing by the image forming apparatus 1. FIG. 28 is a flowchart depicting an example of the flow of the entire processing by the authentication server 5.

The description goes on to the flow of the entire processing by each of the image forming apparatus 1, the wearable computer 2, and the authentication server 5. The description is provided with reference to the flowcharts.

The wearable computer 2 performs processing based on the authentication program 20Q in the steps as shown in FIGS. 24 and 25.

The wearable computer 2 performs processing depending on the mode as discussed below every time the wearable computer 2 detects any one of the following: the wearable computer 2 being worn by a user; entry of a switch command, the wearable computer 2 approaching the image forming apparatus 1 or the terminal 3, and the wearable computer 2 being removed from the user.

When detecting being worn by a user (YES in Step #401 of FIG. 24), the wearable computer 2 generates (Step #402) electrocardiogram data (electrocardiogram data 6D or electrocardiogram data 6H), as with the first embodiment.

If the current mode is the normal mode (YES in Step #403), then the wearable computer 2 performs user authentication on the user as with the first embodiment (Step #404).

After the user is successfully authenticated (YES in Step #405), the wearable computer 2 switches the current mode to the registration mode (Step #407) if the switch command is detected (YES in Step #406) as with the first embodiment.

In contrast, if the current mode is not the normal mode (NO in Step #403), then the wearable computer 2 stores the electrocardiogram data 6H generated into the borrower data storage portion 244 (Step #408).

The wearable computer 2 detects approach thereof to the near field communication device 10i of the image forming apparatus 1 (YES in step #409). If the current mode is the normal mode (YES in Step #410), then the wearable computer 2 sends the owner login request data 6E to the image forming apparatus 1 in the same manner as that in the first embodiment (Step #411).

If the current mode is the borrower registration mode (NO in Step #410, YES in Step #412 of FIG. 25), then the wearable computer 2 sends the electrocardiogram data 6H to the image forming apparatus 1 to request the same to register the borrower (Step #413). When receiving the borrower code data 6P from the image forming apparatus 1 (Step #414), the wearable computer 2 stores the borrower code data 6P into the borrower data storage portion 244 (Step #415) and switches the current mode to the borrower service mode (Step #416).

If the current mode is the borrower service mode (NO in Step #410, NO in Step #412), then the wearable computer 2 sends the borrower login request data 6R to the image forming apparatus 1 to request the same to allow the borrower to log into the image forming apparatus 1 (Step #417).

The wearable computer 2 detects removal thereof from the user (YES in Step #418). If the current mode is the borrower service mode (YES in Step #419), then the wearable computer 2 deletes the electrocardiogram data 6H (Step #420) and switches the current mode to the normal mode (Step #421), as with the first embodiment.

The wearable computer 2 repeats the processing from Steps #401 through #421 appropriately until the wearable computer 2 is turned OFF.

The image forming apparatus 1 performs processing based on the usage management program 10P in the steps as shown in FIGS. 26 and 27.

Every time receiving data from the wearable computer 2, or, alternatively, at predetermined time intervals, the image forming apparatus 1 performs processing as follows.

When receiving the owner login request data 6E (YES in Step #431 of FIG. 26), the image forming apparatus 1 requests user authentication (Step #432) by transferring the owner login request data 6E to the authentication server 5. When the authentication result data 6N is received from the authentication server 5, namely, when the user is successfully authenticated, the user is permitted to log into the image forming apparatus 1 as the owner (Step #433).

While the user logs in (NO in Step #437), the image forming apparatus 1 executes a job in accordance with a command given by the user (YES in Step #434), and generates log data 6F (Step #435) to send the same to the authentication server 5 (Step #436).

When receiving the electrocardiogram data 6H (YES in Step #438), the image forming apparatus 1 makes an inquiry whether or not a user corresponding to the electrocardiogram data 6H is registered in the authentication server 5 (Step #439). At this time, the image forming apparatus 1 transfers the electrocardiogram data 6H to the authentication server 5. When receiving the borrower code data 6P (YES in Step #440), the image forming apparatus 1 generates borrower data 6Q to store the same into the borrower data storage portion 134 (Step #441), and transfers the borrower code data 6P to the wearable computer 2 (Step #442 of FIG. 27).

When receiving the borrower login request data 6R (Yes in Step #433), the image forming apparatus 1 performs user authentication (Step #444). When the user is successfully authenticated, the user is permitted to log into the image forming apparatus 1 as the borrower (Step #445).

While the user logs in (NO in Step #449), the image forming apparatus 1 executes a job in accordance with a command given by the user (YES in Step #446), and generates log data 6S (Step #447) to send the same to the authentication server 5 (Step #448).

If a predetermined amount of time has elapsed since the borrower data 6Q was stored (YES in Step #450), then the image forming apparatus 1 deletes the borrower data 6Q from the borrower data storage portion 134 (Step #451).

When the owner of the wearable computer 2 logs into the image forming apparatus 1 in Step #445, it is possible to delete the borrower data 6Q indicating the user code of the owner as the lender code, namely, electrocardiogram data of the borrower of the wearable computer 2.

The image forming apparatus 1 performs the processing of Steps #431 through #451 appropriately before terminating the borrowed band login service.

The authentication server 5 performs the processing depicted in FIG. 28 based on the authentication program 50Q in accordance with data received from the image forming apparatus 1.

When receiving the owner login request data 6E (YES in Step #461), the authentication server 5 performs user authentication on the owner of the wearable computer 2 (Step #462). When the user is successfully authenticated, the authentication server 5 sends the authentication result data 6N to the image forming apparatus 1 (Step #463).

When receiving the electrocardiogram data 6H from the image forming apparatus 1 (YES in Step #464), the authentication server 5 performs user authentication on the user corresponding to the electrocardiogram data 6H (Step #465). When the user is successfully authenticated, the authentication server 5 sends the borrower code data 6P to the image forming apparatus 1 (Step #466).

When receiving the log data 6F or the log data 6S (YES in Step #467), the authentication server 5 stores the log data 6F or the log data 6S into the log data storage portion 535 (Step #468).

According to the second embodiment, it is possible to make it easy, as compared to conventional technologies, for a user to wear the wearable computer 2 of another user to log into the image forming apparatus 1, as with the first embodiment.

In the second embodiment, the borrower is required to have a user code. However, at the time of login, the wearable computer 2 preferably sends the user code of the borrower instead of the electrocardiogram data. Thus, according to the second embodiment, the communication traffic at the time of login can be reduced, and the processing for user authentication by the image forming apparatus 1 can be facilitated as compared with those in the first embodiment.

In the second embodiment, as the user code, a user code of the lender of the wearable computer 2 is indicated in the log data 6S. Instead of this, however, a user code of the borrower may be indicated as the user code in the log data 6S.

As with the first embodiment, a part of the processing for sending/receiving data between the image forming apparatus 1 and the wearable computer 2 may be performed via the terminal 3 in the second embodiment.

Alternatively, the image forming apparatus 1 may send the electrocardiogram data 6H for the borrower to the authentication server 5. The authentication server 5 may perform user authentication on the borrower based on the electrocardiogram data 6H instead of the electrocardiogram data 6M.

Third Embodiment

Figure 29:
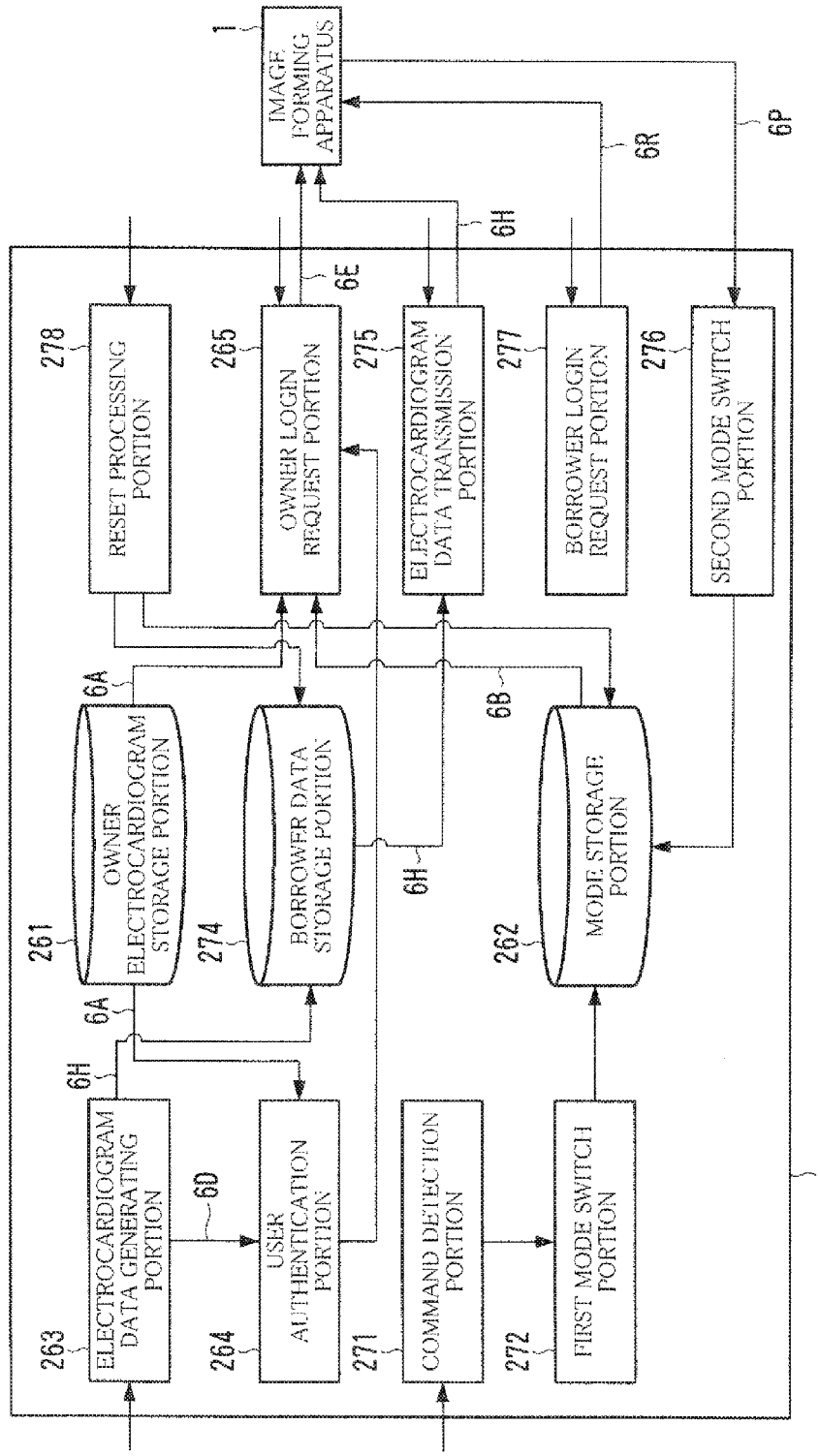
FIG. 29 is a diagram showing an example of the functional configuration of a wearable computer.
Figure 30:
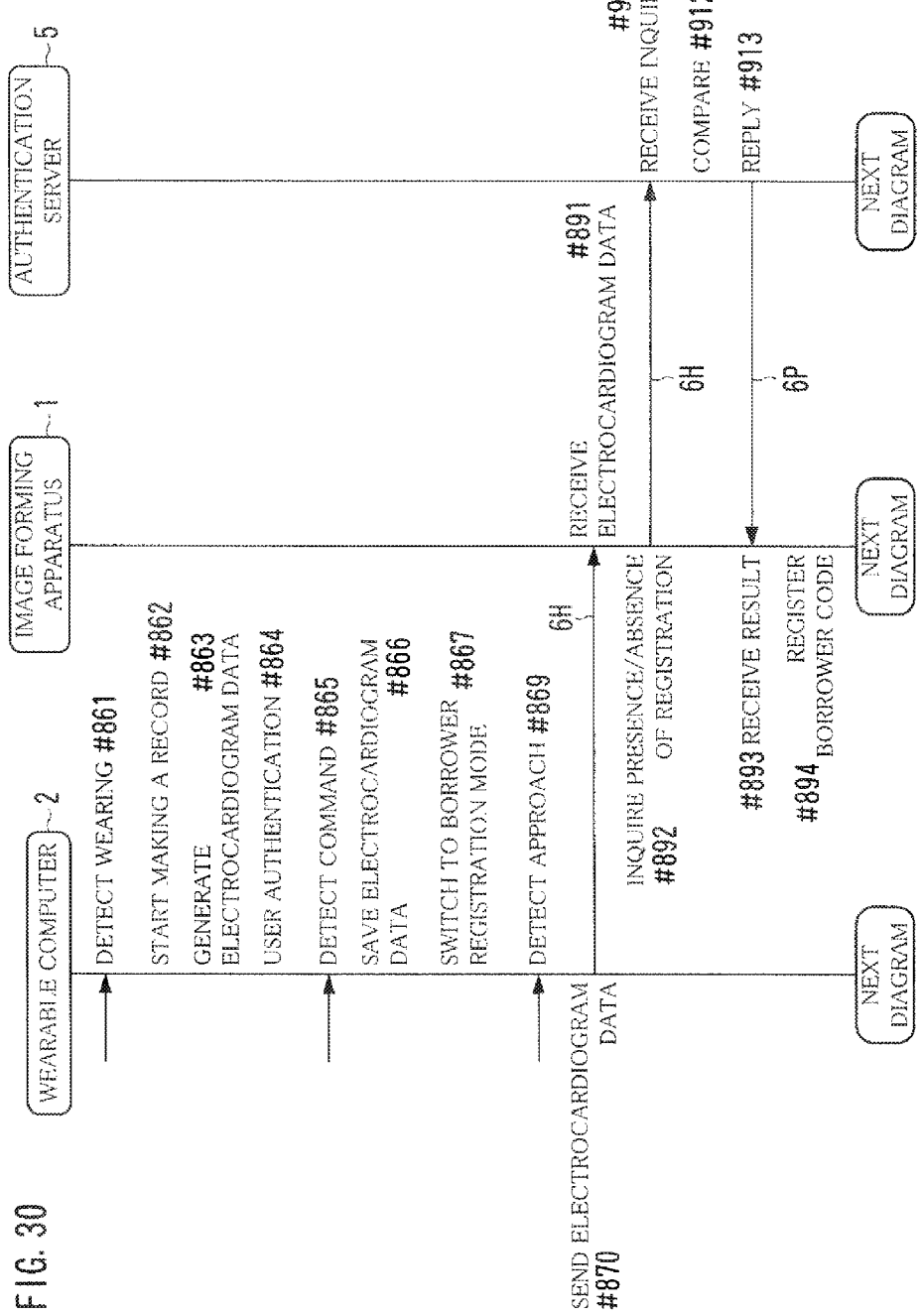
FIG. 30 is a sequence diagram depicting an example of the flow of processing performed by each device for the case where a borrower uses a wearable computer.
Figure 31:
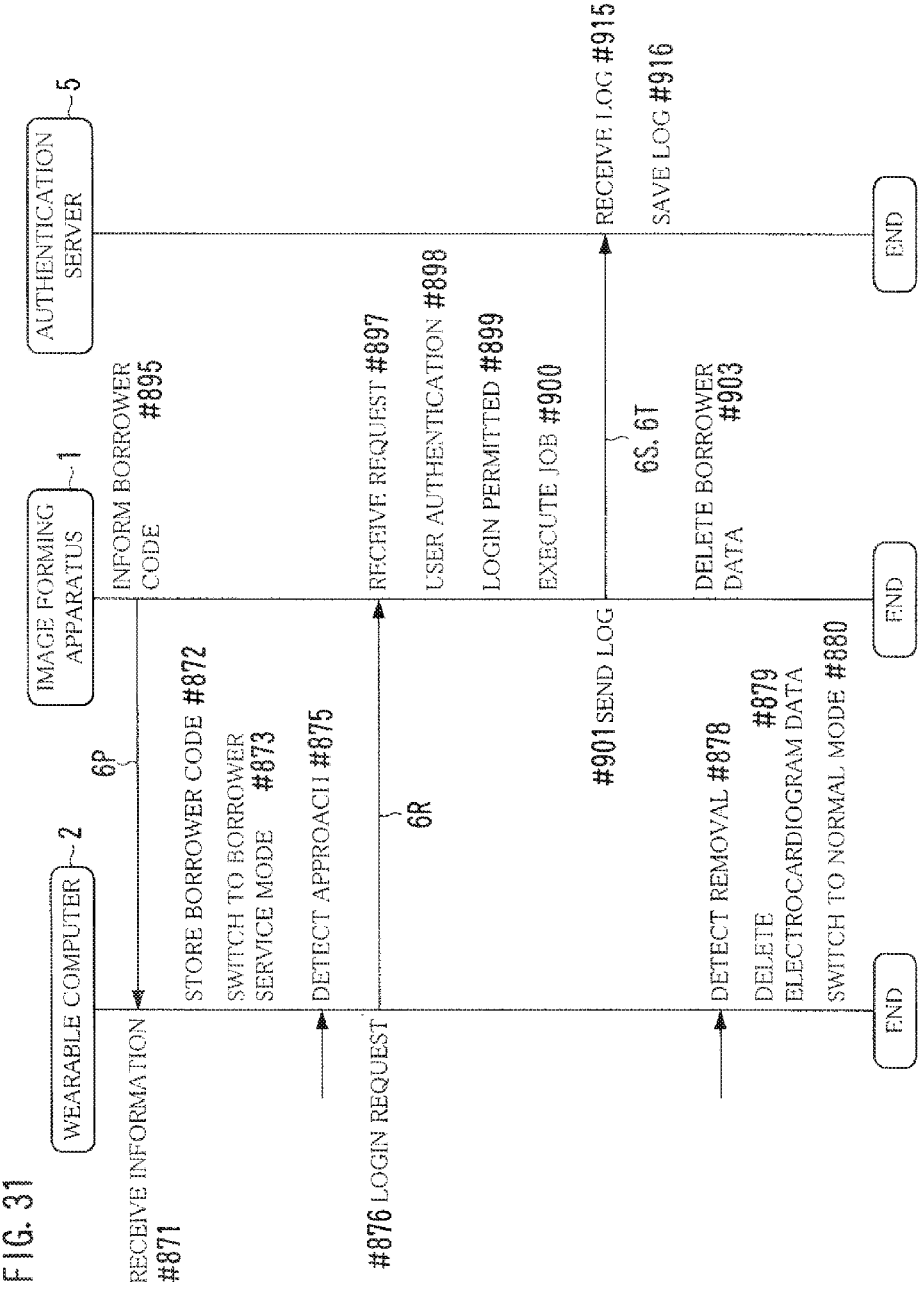
FIG. 31 is a sequence diagram depicting an example of the flow of processing performed by each device for the case where a borrower uses a wearable computer.

FIG. 29 is a diagram showing an example of the functional configuration of the wearable computer 2. FIGS. 30 and 31 are sequence diagrams depicting an example of the flow of processing performed by each device for the case where a borrower uses the wearable computer 2.

In the first and second embodiments, the owner of the wearable computer 2 is required to wear the wearable computer 2 to perform predetermined operation. In the third embodiment, however, all the owner needs to do is to lend the wearable computer 2 to a borrower. The predetermined operation is performed by the borrower.

The overall configuration of an image processing system of the third embodiment is the same as that of the image processing system 200 of the second embodiment, which is shown in FIG. 16. The hardware configuration of each of the devices is the same as that in the second embodiment, which is shown in FIGS. 2, 3, and 17.

It is noted, however, that the ROM 20c or the flash memory 20d of the wearable computer 2 stores therein an authentication program 20R (FIG. 29) instead of the authentication program 20Q.

In the image forming apparatus 1, the usage management program 10Q (FIG. 18) is used as with the second embodiment. In the authentication server 5, the authentication program 50Q is used as with the second embodiment.

The authentication program 20Q implements, in the wearable computer 2, the functions of an owner electrocardiogram storage portion 261, a mode storage portion 262, an electrocardiogram data generating portion 263, a user authentication portion 264, an owner login request portion 265, a command detection portion 271, a first mode switch portion 272, a borrower data storage portion 274, an electrocardiogram data transmission portion 275, a second mode switch portion 276, a borrower login request portion 277, a reset processing portion 278, and so on, all of which are shown in FIG. 29.

The description goes on to the functions of the individual portions shown in FIG. 29. Description of points common to those in the second embodiment shall be omitted.

As with the second embodiment, the wearable computer 2 has the normal mode, the borrower registration mode, and the borrower service mode. The normal mode is set as the default mode.

With the wearable computer 2, the owner electrocardiogram storage portion 261, the mode storage portion 262, the electrocardiogram data generating portion 263, the user authentication portion 264, and the owner login request portion 265 perform processing which is the same as that by the owner electrocardiogram storage portion 231, the mode storage portion 232, the electrocardiogram data generating portion 233, the user authentication portion 234, and the owner login request portion 235, respectively, of the second embodiment (FIG. 19).

The processing by the individual devices for the case where the owner wears the wearable computer 2 to instruct the image forming apparatus 1 to execute a job is the same as that of the second embodiment, which is shown in FIG. 20.

In the case where a borrower uses the wearable computer 2, the individual portions of the image forming apparatus 1, the individual portions of the wearable computer 2, and the individual portions of the authentication server 5 perform processing in the steps as depicted in FIGS. 30 and 31.

The individual portions of the image forming apparatus 1 and the individual portions of the wearable computer 2 perform processing as with the case of the second embodiment. The below description focuses, particularly, on the processing by the wearable computer 2 by taking an example in which the user 8A lends his/her wearable computer 2 to the user 8B.

In the first and second embodiments, the user 8A wears the wearable computer 2 to perform operation for switching to the borrower registration mode. In the third embodiment, however, the user 8A lends the wearable computer 2 to the user 8B without performing the switch operation. It is noted that since the wearable computer 2 is reset, the normal mode is set therein.

In response to the wearable computer 2 worn by the user 8B, the biometric information sensor 20e, the electrocardiogram data generating portion 263, and the user authentication portion 264 respectively senses that the wearable computer 2 is worn, generates electrocardiogram data, and performs user authentication (Steps #861 through #864 of FIG. 30) in a manner similar to that in Steps #801 through #804 of FIG. 21.

However, the user authentication fails because the user 8B, namely, the borrower wears the wearable computer 2 although the normal mode is set therein.

In response to the failure of the user authentication, the user SB performs predetermined operation such as swinging his/her arm or pressing the operation button 20h.

When the predetermined operation is performed, the command detection portion 271 detects a switch command (Step #865).

In response, the electrocardiogram data generating portion 263 stores the electrocardiogram data generated in Step #863 into the borrower data storage portion 274 as the electrocardiogram data 6H (Step #866), and the first mode switch portion 272 updates the mode data 6B to switch the mode to the borrower registration mode (Step #867).

The user 8B moves to the installation site of the image forming apparatus 1 to move the wearable computer 2 closer to the near field communication device 10i.

The near field communication device 20f detects the approach of the wearable computer 2 to the near field communication device 10i (Step #869), the electrocardiogram data transmission portion 275 sends the electrocardiogram data 6H to the image forming apparatus 1 (Step #870) as with the electrocardiogram data transmission portion 245 of the second embodiment.

In response, with the image forming apparatus 1 and the authentication server 5, the registration presence/absence inquiring portion 132, the registration result informing portion 133, and the registration presence/absence determination portion 533 perform processing for checking whether or not an electrocardiogram of the user 8B is registered in the authentication server 5 (Steps #891 through #895 of FIG. 31, and Steps #911 through #913), as with the processing in Steps #831 through #835, and Steps #851 through #853 of the second embodiment. When it is confirmed that the electrocardiogram of the user 8B is registered in the authentication server 5, the borrower data 6Q is stored into the borrower data storage portion 134 and the borrower code data 6P is sent to the wearable computer 2.

With the wearable computer 2, the second mode switch portion 276 receives the borrower code data 6P (Step #871). The second mode switch portion 276 stores the borrower code data 6P into the borrower data storage portion 244 (Step #872) and updates the mode data 6B, so that the current mode is switched to the borrower service mode (Step #873), as with the second mode switch portion 246 of the second embodiment. This switches the mode to the borrower service mode.

By the processing described above, preparation for the user 8B to log into the image forming apparatus 1 is completed.

As with the second embodiment, after the mode of the wearable computer 2 is switched to the borrower service mode, the user 8B moves the wearable computer 2 away from the image forming apparatus 1, and then, moves again the wearable computer 2 closer to the image forming apparatus 1.

In response, the near field communication device 20f and the borrower login request portion 247 of the wearable computer 2 and the borrower authentication portion 135 of the image forming apparatus 1 perform processing for causing the user 8B to log into the image forming apparatus 1 (Steps #876, #897 through #899) as with the processing in Steps #821, #837 through #839 of the second embodiment.

After the login, every time the image forming apparatus 1 executes a job based on a command given by the user 8B (Step #900), the log transmission portion 136 of the image forming apparatus 1 and the log registration portion 534 of the authentication server 5 perform processing for making a record of a job log (Steps #901, #915, and #916) as with the processing in Steps #842, #855, and #856 of the second embodiment.

In the second embodiment, the log transmission portion 136 generates log data 6S to send the same to the authentication server 5. The log data 6S indicates the content of the job and a user code of a lender of the wearable computer 2, namely, the user 8A, in this example. In the third embodiment, it is desirable to generate and send, instead of the log data 6S, log data 6T which indicates the content of the job and a user code of the user who has logged into the image forming apparatus 1, namely, the user 8B, in this example. This is because this enables the borrower to log into the image forming apparatus 1 and to cause the image forming apparatus 1 to execute a job without performing user authentication on the lender.

As with the second embodiment, when the user 8B does not need to use the image forming apparatus 1 anymore, he/she removes the wearable computer 2 from his/her wrist.

In response, the reset processing portion 248 of the wearable computer 2 and the borrower data deletion portion 137 of the image forming apparatus 1 perform the reset processing (Steps #878 through #880 and #903) as with the processing in Steps #823 through #825 and #844 of the second embodiment.

Figure 32:
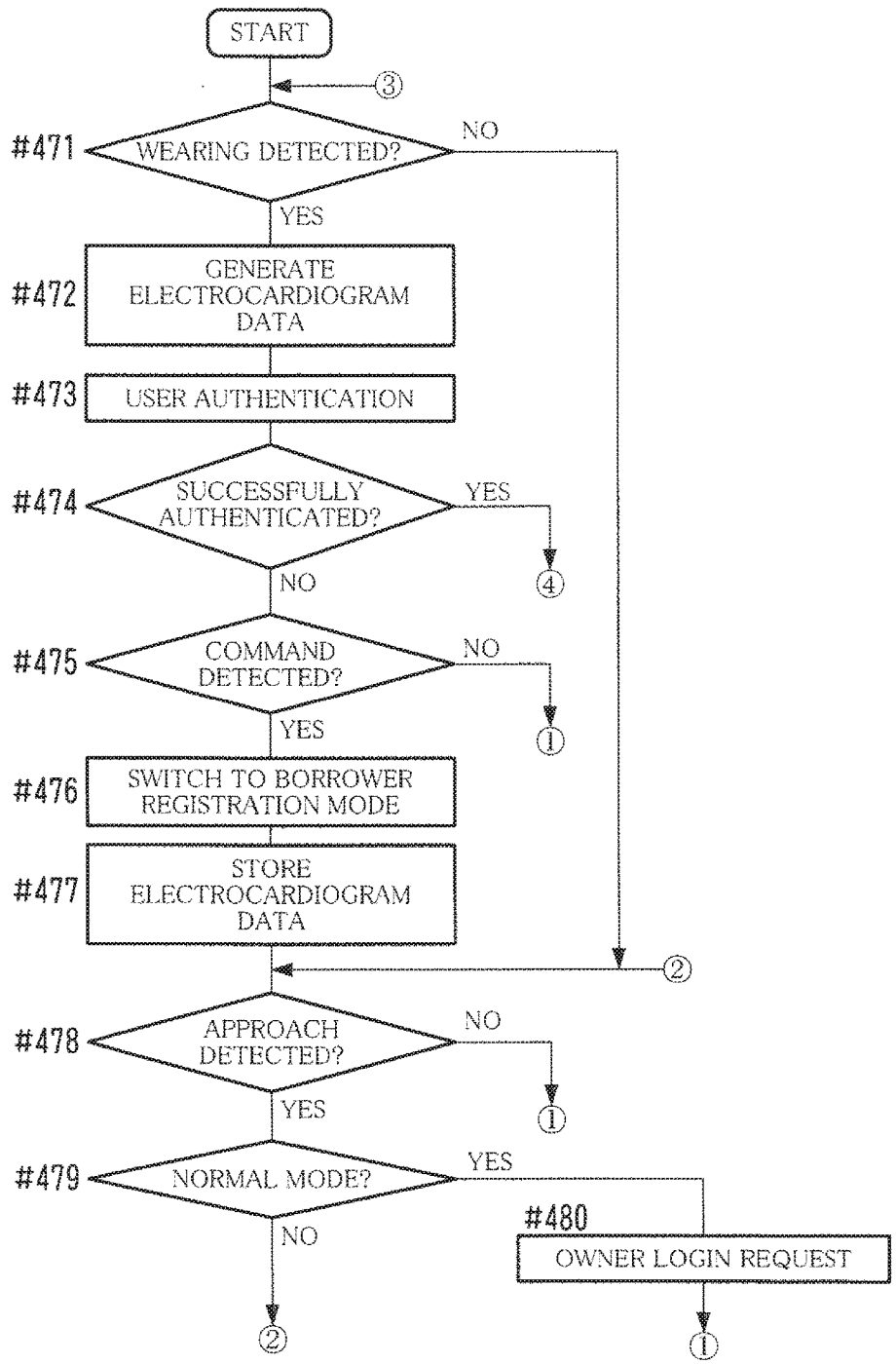
FIG. 32 is a flowchart depicting an example of the flow of the entire processing by a wearable computer.
Figure 33:
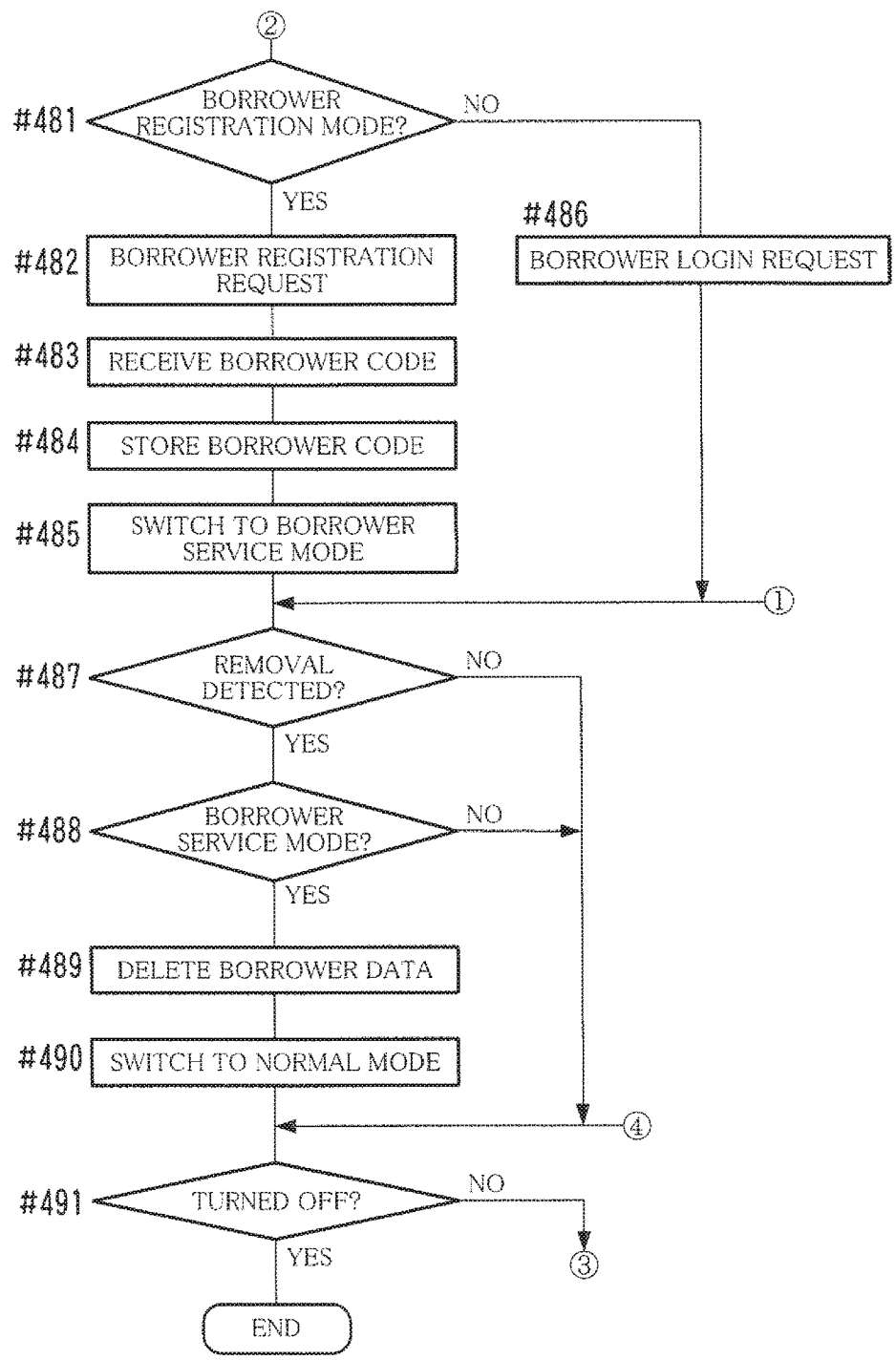
FIG. 33 is a flowchart depicting an example of the flow of the entire processing by a wearable computer.

FIGS. 32 and 33 are flowcharts depicting an example of the flow of the entire processing by the wearable computer 2.

The description goes on to the flow of the entire processing by the wearable computer 2 with reference to the flowcharts.

The wearable computer 2 performs processing based on the authentication program 20R in the steps as shown in FIGS. 32 and 33.

The wearable computer 2 performs processing depending on the mode as discussed below every time the wearable computer 2 detects any one of the following: the wearable computer 2 being worn by a user; the wearable computer 2 approaching the image forming apparatus 1; and the wearable computer 2 being removed from the user.

When detecting being worn by a user (YES in Step #471 of FIG. 32), the wearable computer 2 generates (Step #472) electrocardiogram data (electrocardiogram data 6D or electrocardiogram data 6H), as with the second embodiment.

The wearable computer 2 performs user authentication on the user independent of which mode is entered (Step #473).

When the user is successfully authenticated (YES in Step #474), the wearable computer 2 is used for the owner of the wearable computer 2 to log into the image forming apparatus 1 while worn by the owner, as with the second embodiment.

If the user authentication fails (NO in Step #474), and further, if a switch command is entered (YES in Step #475), then the wearable computer 2 switches the mode to the borrower registration mode (Step #476) and stores the electrocardiogram data 6H generated in Step #472 into the borrower data storage portion 274 (Step #477).

When the wearable computer 2 detects approach thereof to the near field communication device 10i of the image forming apparatus 1 (YES in Step #478), the wearable computer 2 performs processing depending on the mode (Steps #479 through #486 of FIG. 33), as with the processing in Steps #410 through #417 of the second embodiment (FIGS. 24 and 25).

When the wearable computer 2 detects removal thereof from the user (YES in Step #487), the wearable computer 2 performs the reset processing (Steps #489 and #490) provided that the mode is the borrower service mode (YES in Step #488), as with the processing in Steps #420 and #421 of the second embodiment.

The wearable computer 2 repeats the processing from Steps #471 through #490 appropriately until the wearable computer 2 is turned OFF.

When the user authentication fails in Step #473, the wearable computer 2 may switch the current mode to the borrower registration mode without waiting for a switch command to be entered.

The flow of the entire processing by each of the image forming apparatus 1 and the authentication server 5 is similar to that of the second embodiment, which is discussed earlier with reference to FIGS. 26 through 28.

It is desirable, however, that the image forming apparatus 1 generates the log data 6T instead of the log data 6S. To be specific, it is desirable to record job execution for the borrower of the wearable computer 2 not for the owner (lender) thereof.

According to the third embodiment, it is possible to make it easy, as compared to conventional technologies, for a user to wear the wearable computer 2 of another user to log into the image forming apparatus 1, as with the first and second embodiments.

Further, according to the third embodiment, the owner of the wearable computer 2 does not need to perform the predetermined operation, which makes it possible to lend the wearable computer 2 more easily than with the first and second embodiments.

As with the first embodiment, a part of the processing for sending/receiving data between the image forming apparatus 1 and the wearable computer 2 may be performed via the terminal 3 in the third embodiment.

Alternatively, the image forming apparatus 1 may send the electrocardiogram data 6H for the borrower to the authentication server 5. The authentication server 5 may perform user authentication on the borrower based on the electrocardiogram data 6H instead of the electrocardiogram data 6M.

In the first through third embodiments, the near field communication device 20f detects approach of the near field communication device 20f of the wearable computer 2 to the near field communication device 10i of the image forming apparatus 1. Instead of this, however, the near field communication device 10i may detect the approach thereof.

In such a case, after the detection, the image forming apparatus 1 requests data from the wearable computer 2. In response to the request, the individual portions of the wearable computer 2 send data to the image forming apparatus 1 by means of the near field communication device 20f as described above.

In such a case, an Integrated Circuit (IC) tag rather than the near field communication device 20f may be used. Every time the mode is switched to another mode, the wearable computer 2 preferably replaces data stored in a read-out memory of an IC tag with data depending on the mode.

The specific examples are described below. In the first embodiment, when the mode is switched to the normal mode, the data stored in the memory is replaced with the owner login request data 6E. When the mode is switched to the borrower registration mode, the data stored in the memory is replaced with the registration request data 6G. Thereafter, when the image forming apparatus 1 reads out the registration request data 6G, the data stored in the memory is replaced with the electrocardiogram data 6H. When the mode is switched to the borrower service mode, the data stored in the memory is replaced with the borrower login request data 6K.

In the second embodiment, when the mode is switched to the normal mode, the data stored in the memory is replaced with the owner login request data 6E. When the mode is switched to the borrower registration mode, the data stored in the memory is replaced with the borrower registration mode, the data stored in the memory is replaced with the electrocardiogram data 6H. When the mode is switched to the borrower service mode, the data stored in the memory is replaced with the borrower login request data 6K. The same applies to the third embodiment.

The image forming apparatus 1 preferably writes the completion notice data 6J and the borrower code data 6P onto the write memory of an IC tag of the wearable computer 2.

In the first through third embodiments, the wearable computer 2 deletes the electrocardiogram data 6H at a time when the wearable computer 2 is removed from the user. Instead of this, however, the wearable computer 2 may delete the electrocardiogram data 6H at another time. For example, at a time when the number of times of the removal from the user reaches a predetermined number of times (five times, for example), the wearable computer 2 may delete the electrocardiogram data 6H. Alternatively, at a time when a predetermined amount of time or day has elapsed since the electrocardiogram data 6H was stored, the wearable computer 2 may delete the electrocardiogram data 6H. As to the image forming apparatus 1, the electrocardiogram data 6H or the borrower data 6Q may be deleted at a time similar to that in the wearable computer 2.

In the first through third embodiments, the case is described in which one user is the borrower. However, the wearable computer 2 may be used also when a plurality of users is the borrower.

In such a case, the wearable computer 2 or the image forming apparatus 1 stores, therein, the electrocardiogram data 6H or the borrower data 6Q of each of the users.

Every time when being worn, the wearable computer 2 obtains an electrocardiogram and matches the electrocardiogram obtained against an electrocardiogram of the stored electrocardiogram data 6H, so as to identify a user who wears the wearable computer 2 or to determine that the wearable computer 2 is worn by a new user.

When identifying a user who wears the wearable computer 2, the wearable computer 2 operates with the identified user regarded as a borrower. When determining that the wearable computer 2 is worn by the new user, the wearable computer 2 performs processing for registering the new user. After the registration, the wearable computer 2 operates with the new user regarded as a borrower while the wearable computer 2 is worn by the new user.

In the case where the number of times when the wearable computer 2 is removed from a borrower reaches a predetermined number of times, the electrocardiogram data 6H and the borrower data 6Q may be deleted. Alternatively, at a time when a predetermined amount of time or day has elapsed since the electrocardiogram data 6H or the borrower data 6Q was recorded, the electrocardiogram data 6H or the borrower data 6Q may be deleted.

In the foregoing embodiments, an electrocardiogram is used as information representing physical characteristics of a user (biometric information). Using other biometric information is also possible. For example, the amount of oxygen in the blood may be used as the biometric information. In such a case, the wearable computer 2 may be a wearable computer provided with an oximeter. Alternatively, an iris may be used as the biometric information. In such a case, the wearable computer 2 may be a glass-type wearable computer provided with a camera for photographing an eye.

In the first through third embodiments, the log data 6F, 6S, and 6T are saved to the authentication server 5. Instead of this, the log data 6F, 6S, and 6T may be saved to the image forming apparatus 1.

The first user authentication portion 102, the second user authentication portion 107, the login process portion 131, and the borrower authentication portion 135 are examples of a second determination portion. The log transmission portion 136 is an example of a recording portion. The owner electrocardiogram storage portions 201, 231, and 261 are examples of a first storage portion.

The biometric information sensor 20e and the electrocardiogram data generating portions 203, 233 and 263 are examples of an obtaining portion. The near field communication device 20f is an example of a detector. The user authentication portions 204, 234, and 264 are example of a first determination portion or a determination portion.

The owner login request portions 205, 235, and 265 are examples of a first request portion. The borrower electrocardiogram storage portion 214 and the borrower data storage portions 244 and 274 are examples of a second storage portion. The electrocardiogram data transmission portions 215, 245, and 275 are examples of a transmission portion. The borrower login request portions 217, 247, and 277 are examples of a second request portion.

The owner electrocardiogram data 6A is an example of data indicating a first characteristic. The electrocardiogram data 6D and 6H are examples of data indicating a second characteristic. The log data 6F, 6S, and 6T are examples of data indicating a track record.

It is to be understood that the configurations of the image processing system 100, the image processing system 200, the image forming apparatus 1, the wearable computer 2, the terminal 3, and the authentication server 5, the constituent elements thereof, the content of the processing, the order of the processing, the structure of the data, and the like may be appropriately modified without departing from the spirit of the present invention.

Although the present invention has been described and illustrated in detail, it is clearly understood that the present invention is by way of illustrated and example only and is not to be taken by way of limitation, the scope of the present invention being interpreted by terms of the appended claims.

What is claimed is:

1. An image processing system comprising:
an image forming apparatus; and
a wearable computer;
wherein the wearable computer includes a first hardware processor which is configured to:

permanently store, in a first storage, a first characteristic, the first characteristic representing a physical characteristic of an owner of the wearable computer, obtain a second characteristic, the second characteristic representing a physical characteristic of a user who wears the wearable computer, determine whether or not the user is the owner based on the first characteristic and the second characteristic, make a first request, when the user is determined to be the owner, to allow the user to log into the image forming apparatus, temporarily store the second characteristic in a second storage, and make a second request, when the user is not determined to be the owner, to allow the user to log into the image forming apparatus by sending the second characteristic stored in the second storage to the image forming apparatus; and the image forming apparatus includes a second hardware processor which is configured to determine or to cause another device to determine whether or not the user is a specific user based on the second characteristic sent from the wearable computer, and to allow the user to log in when it is determined that the user is the specific user.

2. The image processing system according to claim 1, wherein the second hardware processor of the image forming apparatus is further configured to perform processing for, when the user is determined to be the owner or the specific user and then a job is executed based on a command given by the user, making a record of execution of the job.

3. The image processing system according to claim 2, wherein the record shows any one of the user and the owner.

4. The image processing system according to claim 1, wherein the wearable computer has:

a borrower registration mode in which, before a predetermined amount of time has elapsed since the owner removed the wearable computer, the second characteristic of a user who wears the wearable computer is registered in the image forming apparatus, and a borrower service mode in which the image forming apparatus is caused to determine whether or not the user is the specific user based on the second characteristic registered in the image forming apparatus and the second characteristic sent by the wearable computer.

5. A wearable computer used for logging into another device, the wearable computer comprising:

a hardware processor configured to:

permanently store, in a first storage, a first characteristic therein, the first characteristic representing a physical characteristic of an owner of the wearable computer;

obtain a second characteristic, the second characteristic representing a physical characteristic of a user who wears the wearable computer;

determine whether or not the user is the owner based on the first characteristic and the second characteristic;

make a first request, when the user is determined to be the owner, to allow the user to log into said another device;

temporarily store the second characteristic in a second storage; and make a second request, when the user is not determined to be the owner, to allow the user to log into said another device by sending the second characteristic stored in the second storage portion to said another device.

6. The wearable computer according to claim 5, further comprising a detector configured to detect approach of the wearable computer to said another device;

wherein when the detector detects approach of the wearable computer to said another device, the hardware processor makes the second request.

7. The wearable computer according to claim 6, wherein the detector detects approach of the wearable computer to said another device by near field communication.

8. The wearable computer according to claim 5, wherein the hardware processor stores the obtained second characteristic in the second storage stores therein, after the hardware processor determines that the user is the owner, the user performs a predetermined operation, and the wearable computer is removed from the user.

9. The wearable computer according to claim 5, further comprising a transmitter configured to send to said another device, before the second request by the hardware processor, the second characteristic to enable said another device to perform authentication of the user.

10. The wearable computer according to claim 5, wherein the hardware processor stores the obtained second characteristic in the second storage when the hardware processor determines that the user is not the owner.

11. The wearable computer according to claim 5, wherein the hardware processor stores the obtained second characteristic in the second storage when the hardware processor determines that the user is not the owner and then the user performs a predetermined operation.

12. The wearable computer according to claim 5, wherein the hardware processor deletes the second characteristic from the second storage at a predetermined time.

13. The wearable computer according to claim 12, wherein the predetermined time is a time at which the wearable computer is removed from the user.

14. The wearable computer according to claim 5, wherein the hardware processor is configured to:

store, in the first storage, as the first characteristic, a pulse of the owner, and the hardware processor obtains, as the second characteristic, the pulse of the user.

15. The wearable computer according to claim 5, wherein the wearable computer has:

a borrower registration mode in which, before a predetermined amount of time has elapsed since the owner removed the wearable computer, the second characteristic of a user who wears the wearable computer is registered in the image forming apparatus, and a borrower service mode in which the image forming apparatus is caused to determine whether or not the user is the specific user based on the second characteristic registered in the image forming apparatus and the second characteristic sent by the wearable computer.

16. A method for user authentication comprising:

preparing a first storage for permanently storing a first characteristic in a wearable computer used for logging into an image forming apparatus, the first characteristic representing a physical characteristic of an owner of the wearable computer;

executing, by the wearable computer, processing for obtaining a second characteristic, the second characteristic representing a physical characteristic of a user who wears the wearable computer;

executing, by the wearable computer, processing for determining whether or not the user is the owner based on the first characteristic and the second characteristic;

executing, by the wearable computer, processing for making a first request to allow the user to log into the image forming apparatus when the user is determined to be the owner;

executing, by the wearable computer, processing for temporarily storing the second characteristic into a second storage;

executing, by the wearable computer, processing for making a second request, when the user is not determined to be the owner, to allow the user to log into the image forming apparatus by sending the second characteristic stored in the second storage to the image forming apparatus; and executing, by the image forming apparatus, processing for determining or causing another device to determine whether or not the user is a specific user based on the second characteristic sent from the wearable computer; and executing, by the image forming apparatus, processing for allowing the user to log in when it is determined that the user is the specific user.

17. The method according to claim 16, wherein the wearable computer has:

a borrower registration mode in which, before a predetermined amount of time has elapsed since the owner removed the wearable computer, the second characteristic of a user who wears the wearable computer is registered in the image forming apparatus, and a borrower service mode in which the image forming apparatus is caused to determine whether or not the user is the specific user based on the second characteristic registered in the image forming apparatus and the second characteristic sent by the wearable computer.

18. A non-transitory recording medium storing a computer readable program for controlling a wearable computer, the wearable computer being used for logging into another device and being provided with a first storage for permanently storing a first characteristic therein, the first characteristic representing a physical characteristic of an owner of the wearable computer, the computer readable program controlling the wearable computer to execute processing comprising:

processing for obtaining a second characteristic, the second characteristic representing a physical characteristic of a user who wears the wearable computer;

processing for determining whether or not the user is the owner based on the first characteristic and the second characteristic;

processing for making a first request to allow the user to log into said another device when the user is determined to be the owner;

processing for temporarily storing the second characteristic into a second storage; and processing for making a second request, when the user is not determined to be the owner, to allow the user to log into said another device by sending the second characteristic stored in the second storage to said another device.

19. The non-transitory recording medium according to claim 18, wherein the wearable computer has:

a borrower registration mode in which, before a predetermined amount of time has elapsed since the owner removed the wearable computer, the second characteristic of a user who wears the wearable computer is registered in the image forming apparatus, and a borrower service mode in which the image forming apparatus is caused to determine whether or not the user is the specific user based on the second characteristic registered in the image forming apparatus and the second characteristic sent by the wearable computer.

* * * * *